(12) United States Patent
O'Keeffe et al.

(10) Patent No.: US 12,249,329 B2
(45) Date of Patent: Mar. 11, 2025

(54) SYSTEMS, DEVICES, AND METHODS FOR ENHANCING USER PRIVACY AND/OR USER CONTROL OVER AUDIO-ACTIVATED DEVICES

(71) Applicants: Gregory O'Keeffe, Boston, MA (US); Brian Dutton, Boston, MA (US); George Rice, Boston, MA (US)

(72) Inventors: Gregory O'Keeffe, Boston, MA (US); Brian Dutton, Boston, MA (US); George Rice, Boston, MA (US)

( * ) Notice: Subject to any disclaimer, the term of this patent is extended or adjusted under 35 U.S.C. 154(b) by 184 days.

(21) Appl. No.: 17/784,480

(22) PCT Filed: Dec. 10, 2020

(86) PCT No.: PCT/US2020/064380
§ 371 (c)(1),
(2) Date: Jun. 10, 2022

(87) PCT Pub. No.: WO2021/119362
PCT Pub. Date: Jun. 17, 2021

(65) Prior Publication Data
US 2024/0056522 A1 Feb. 15, 2024

Related U.S. Application Data

(60) Provisional application No. 62/946,255, filed on Dec. 10, 2019.

(51) Int. Cl.
*H04M 1/72454* (2021.01)
*G10L 15/22* (2006.01)
*H04M 1/72463* (2021.01)

(52) U.S. Cl.
CPC ......... *G10L 15/22* (2013.01); *H04M 1/72454* (2021.01); *H04M 1/72463* (2021.01)

(58) Field of Classification Search
CPC .............. G10L 15/22; G10L 2015/088; G10L 2015/223; G10L 21/0208; G10L 15/20;
(Continued)

(56) References Cited

U.S. PATENT DOCUMENTS

2007/0237334 A1* 10/2007 Willins ................. H03G 7/002
381/95
2011/0045907 A1 2/2011 Villa et al.
(Continued)

OTHER PUBLICATIONS

O'Keeffe, Gregory; International Application No. PCT/US2020/064380; filed Dec. 10, 2020; International Search Report and Written Opinion; ISA/US; Mar. 15, 2021; 12 pp.
(Continued)

*Primary Examiner* — Nimesh Patel
(74) *Attorney, Agent, or Firm* — Resonance IP Law, PC

(57) ABSTRACT

Systems and devices may receive an ambient noise signal and use that ambient noise signal to generate a distorted ambient noise signal that may be provided to a speaker that is proximate to a microphone of the audio-activated device so that the speaker may project sound corresponding to the distorted ambient noise into the microphone of the audio-activated device so that, for example, that the audio-activated device cannot decipher speech and other sounds in the ambient noise of an environment. While the distorted ambient noise is being projected into the microphone of the audio-activated device, it may be scanned and/or analyzed to determine whether an audio trigger (e.g., an audio trigger or phrase) is included therein and, if so, an undistorted ambient noise signal may be communicated to the speaker of the audio-activated device so that the audio-activated device may respond to a command included in the ambient noise.

22 Claims, 16 Drawing Sheets

(58) Field of Classification Search
CPC ......... G10L 25/51; G10L 15/08; G10L 25/84;
G10L 13/02; G10L 17/00; G10L 21/0216;
G10L 21/0272; G10L 17/04; G10L
13/027; G10L 15/16; G10L 25/78; G10L
15/30; G10L 17/02; G10L 2021/02087;
G10L 2025/783; G10L 15/00; G10L
15/24; G10L 15/02; G10L 15/1822; G10L
17/06; G10L 21/003; G10L 15/005; G10L
2021/02165; G10L 2021/02082; G10L
15/063; G10L 2015/227; G10L 15/142;
G10L 19/012; G10L 25/00; G10L 15/32;
G10L 2015/0631; G10L 21/0364; G10L
19/02; G10L 19/26; G10L 15/28; G10L
19/00; G10L 19/22; G10L 19/028; G10L
19/20; G10L 2015/086; G10L 2021/0135;
G10L 2021/02085; G10L 2025/786;
G10L 25/93; G10L 25/90; G10L 25/69;
H04M 1/72454; H04M 1/72463; H04M
2250/52; H04M 2242/30; H04M 11/04;
H04M 2250/74; H04M 2201/40; H04M
1/271; H04M 9/082; H04M 1/2155;
H04M 2203/509; H04M 3/5166; H04M
3/567; H04M 3/568; H04M 7/0078;
H04M 2201/39; H04W 88/02; G06F
3/167; G06F 21/32; G06F 3/16; G06F
1/3287; G06F 18/24; G06V 40/172;
G06V 40/171; G06V 40/166; G06V
40/176; G06V 20/52; G06V 40/20; G06V
40/16; G06V 40/40; G06V 40/70; G06V
10/145; G06V 10/82; G06V 40/174;
G06V 40/45; H04R 1/1083; H04R
2460/01; H04R 3/005; H04R 1/10; H04R
1/406; H04R 1/08; H04R 1/04; H04R
1/323; H04R 1/326; H04R 2410/01;
H04R 2205/024; H04R 29/004; H04R
3/00; H04R 5/027; H04R 9/08; H04R
1/1041; H04R 2201/107; H04R 2420/07;
H04R 2499/13; H04R 25/554; H04R
1/028; H04R 1/342; H04R 1/38; H04R
11/02; H04R 19/04; H04R 2203/12;
H04R 3/12; A61B 2017/00203; A61B
2560/0252; A61B 2560/0257; A61B
5/117; A61B 5/7203

See application file for complete search history.

(56) References Cited

U.S. PATENT DOCUMENTS

| | | |
|---|---|---|
| 2014/0006025 A1 | 1/2014 | Krishnan et al. |
| 2014/0222436 A1* | 8/2014 | Binder .................. G10L 21/16 |
| | | 704/275 |
| 2016/0173049 A1* | 6/2016 | Mehta ..................... H03G 3/32 |
| | | 381/57 |
| 2017/0125038 A1* | 5/2017 | Hassani ................ G10L 13/033 |
| 2018/0293995 A1* | 10/2018 | Makela ............... G10L 21/0208 |
| 2019/0281341 A1* | 9/2019 | Lawrence ........ H04N 21/41265 |
| 2020/0004396 A1* | 1/2020 | DeLuca .................. G10L 15/22 |
| 2020/0260186 A1* | 8/2020 | Stachura ................ G06F 3/017 |

OTHER PUBLICATIONS

Cho. "Hey Google, Can I Ask You Something in Private?" In: Proceedings of the 2019 CHI Conference on Human Factors in Computing Systems. May 9, 2019 (May 9, 2019) Retrieved on Feb. 7, 2021 (Feb. 7, 2021) from <http://library.usc.edu.ph/ACM/CHI2019/1 proc/paper258.pdf> entire document.

Gray. "Always on: privacy implications of microphone-enabled devices." In: Future of privacy forum. Apr. 2016 (Apr. 2016) Retrieved on Feb. 7, 2021 (Feb. 7, 2021) from <https://fpf.org/wp-contentluploads/20 16/04/FPF _Always_ On_ WP .pdf> entire document.

* cited by examiner

SYSTEMS, DEVICES, AND METHODS FOR ENHANCING USER PRIVACY AND/OR USER CONTROL OVER AUDIO-ACTIVATED DEVICES

RELATED APPLICATION

This application is an INTERNATIONAL (PCT) application of U.S. Provisional Patent Application No. 62/946,255 filed on 10 Dec. 2019 and entitled "SYSTEMS, DEVICES, AND METHODS FOR PROTECTING USER PRIVACY AND/OR ENHANCING USER CONTROL OVER AI-ENABLED SMART DEVICES" which is incorporated herein in its entirety.

FIELD OF INVENTION

The present invention is in the field of consumer electronics, more particularly, it relates to systems, devices, and methods for enhancing user control over the functionality of audio-activated and/or voice-activated devices.

BACKGROUND

The advent of audio-activated devices has raised privacy concerns because, by their nature, these audio-activated devices must be always listening for the presence of an audio trigger, such as an audio trigger, that may be present in ambient noise within an environment. There is no way to selectively turn this feature of audio-activated devices off while maintaining the capability of voice-activated commands for the audio-activated device.

SUMMARY

Systems and devices may receive an ambient noise signal from a microphone of and use that ambient noise signal to generate a distorted ambient noise signal configured to disrupt, or distort, ambient noise that may be received and analyzed by an audio-activated device. The distorted ambient noise signal may be provided to a speaker that is proximate to a microphone of the audio-activated device so that the speaker may project sound corresponding to the distorted ambient noise into the microphone of the audio-activated device. While the distorted ambient noise is being projected into the microphone of the audio-activated device, it may be scanned and/or analyzed to determine whether an audio trigger (e.g., an audio trigger or phrase) is included therein. When the audio trigger is detected, communication of the distorted ambient noise signal may be paused and an undistorted ambient noise signal may be communicated to the speaker so that undistorted ambient noise, which may include a voice command for the audio-activated device, may be communicated (via sound coming from the speaker) to the audio-activated device.

Systems, devices, and/or methods disclosed herein may receive an ambient noise signal from, for example, a microphone and generate a distorted ambient noise signal they're from. The distorted ambient noise signal maybe generated by, for example, application of a noise distortion algorithm to the ambient noise signal, filtering of the ambient noise signal, adjusting an amplitude of the ambient noise signal, adjusting a frequency included in the ambient noise signal, adding sound to the ambient noise signal, adding interference to the ambient noise signal, and combinations thereof. In some embodiments, distortion of the ambient noise signal maybe responsive to a characteristic of the ambient noise signal. Exemplary characteristics of the ambient noise signal include, but are not limited to, a volume of the ambient noise signal, interference present in the ambient noise signal, frequencies present in the ambient noise signal, and/or amplitudes of sound present in the ambient noise signal.

The distorted ambient noise signal may then be communicated to a speaker communicatively coupled to the processor. Often times, the speaker may be positioned proximate to a microphone of an audio-activated device so that, for example, sound produced by the speaker may disrupt or otherwise distort, ambient noise received by the microphone of the audio-activated device.

The ambient noise signal maybe scanned, or analyzed, to determine whether an audio trigger (e.g., an audio trigger or phrase) is included therein. In some embodiments, this scanning may be performed concurrently with provision of the distorted ambient noise signal to the speaker. In other embodiments, there may be a lag time between when the ambient noise signal is received by the microphone of the system (this may be an accomplished by buffering the received ambient noise signal) and the distorted ambient noise signal is provided to the speaker so that, for example, the ambient noise signal may be analyzed for the presence of an audio trigger.

When the audio trigger is present in the ambient noise signal, the processor may communicate an undistorted ambient noise signal to the speaker via for example relaying the undistorted ambient noise signal received by the microphone to the speaker without any adulteration so that, for example, a user may articulate a voice or other audio command to the audio-activated device. In some embodiments, provision of the distorted ambient noise signal to the speaker maybe paused prior to provision of the undistorted ambient noise signal to the speaker. In some embodiments, pausing of the communication of the distorted ambient noise signal to a speaker may last for a duration of time. At times, the duration of time is responsive to an instruction received from a user.

In some embodiments, it may be determined whether a user of the audio-activated device has concluded communicating with the audio-activated device and, if so, communication of the distorted ambient noise signal to the speaker may resume. This determination may be made by, for example, determining whether or any speech oral language is present in the ambient noise signal and/or determining that a volume of the ambient noise signal has decreased, which may serve to indicate that a user has finished speaking or communicating with the audio-activated device.

In some embodiments, the ambient noise signal received following receipt of the ambient noise signal containing the trigger word maybe scanned for the presence of spoken language and communication of the distorted ambient noise signal to the speaker maybe resumed responsively to a determination that the ambient noise signal received following receipt of the ambient noise signal containing the trigger word does not include the presence of spoken language. In some embodiments, the scanning of the ambient noise signal received following receipt of the ambient noise signal containing the trigger word maybe continuous, periodic (e.g., every 2 seconds), and/or as-needed.

When it is determined that an audio command included within the ambient noise signal is complete communication of the distorted ambient noise signal to the speaker maybe resumed.

In some embodiments, the audio-activated device includes a camera and the systems, devices, and/or methods disclosed herein may act to selectively obscure the camera so as to, for example, prevent the camera from capturing visual information in an environment. In these embodiments obscuring of the camera may be linked to provision of the distorted ambient noise signal to the speaker so that, for example, upon detection of the audio trigger, the obscuring of the camera may stop so that the camera may capture visual information.

BRIEF DESCRIPTION OF THE DRAWINGS

The present invention is illustrated by way of example, and not limitation, in the figures of the accompanying drawings in which.

DESCRIPTION

Figure 1:
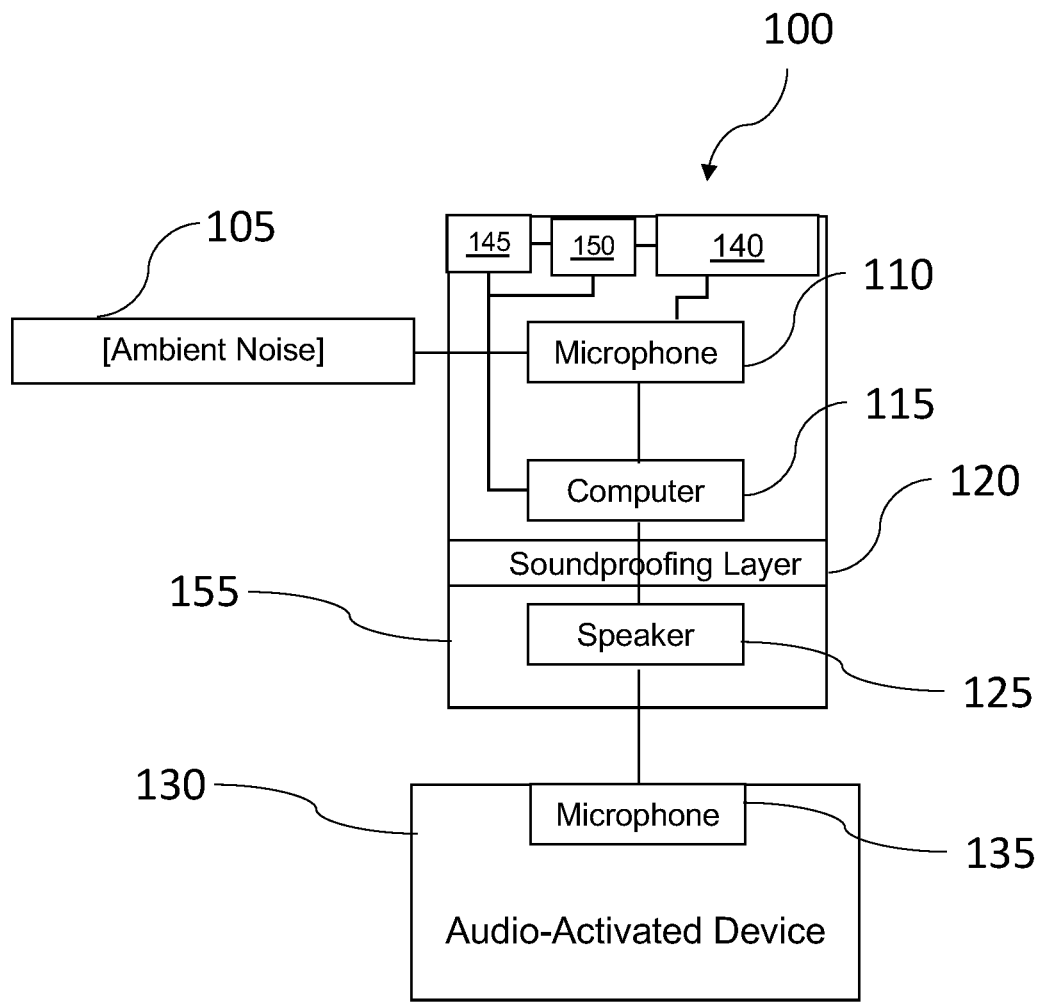
FIG. 1 is a block diagram of an exemplary system, consistent with some embodiments of the present invention.

The advent of new, connected devices that interface with audio-enabled devices with voice-activated assistants has created a new opportunity to automate daily activities and to adjust home environmental conditions to suit a particular user's preferences. These devices feature internet connectivity and typically integrate a speaker for audio output and microphone, or an array of microphones communicatively connected to a processor housed within the body of the device. The processor is programmed to respond to a user Wake Word or phrase such as "Alexa" in the case of Amazon's Echo, or "Okay Google" in the case of Google Home. Many people will be familiar with Apple's "Siri" feature which responds to the Wake Word, "Hey Siri."

Exemplary audio-enabled devices include mobile phones, tablet computers, smart watches, appliances, home audio-activated devices such as Google Home and Amazon Echo ("Alexa").

When the Wake Word or phrase is detected by the processor, the smart device, or audio-activated device, then listens for a command which is processed by an artificial intelligence ("AI") algorithm to perform a function. Functions may include but are not limited to moderating home temperature via a smart thermostat, adjusting lighting, playing music, making online purchases, and setting alarms or reminders.

Because the Wake Word may be detected at any moment, the microphones are always "listening." Furthermore, the makers of such devices—Apple, Amazon, and Alphabet, for example—store data collected through these smart home devices for ongoing R&D purposes, as well as marketing and other uses. This has resulted in a situation in which user privacy in the form of audio and/or video may be compromised through either a malicious 3 rd party attack or passively and purposefully, though not necessarily with a user's knowledge, by the device-makers.

In principle, users have no way of knowing for certain whether their devices are recording audio/video, as even modifying preferences does not guarantee that the underlying software hasn't been compromised or hacked. Consumers generally expect that their devices will function as advertised without abusing their trust or conducting background activities that they are not aware of.

The invention disclosed herein is intended to serve as a "shield" or "barrier" between the user and the audio-enabled device, or audio-activated device, providing the user with a layer of security and control that cannot otherwise be guaranteed.

Disclosed herein are methods, devices, and systems configured and designed to enhance user privacy by interfering with audio-enabled devices' ability to receive, process, and transmit audio and/or video. For example, the systems and devices disclosed herein may operate to interfere with an ability of an audio-enabled device's microphone to detect ambient noise in a user's environment so that the microphone cannot "listen in" on what the user may be saying or doing. This may be done by, for example, projecting audio interference into the microphone and/or mechanically blocking sound from entering the microphone. Additionally, or alternatively, the systems and devices disclosed herein may interfere with an ability of an audio-enabled device's camera to capture video of a user's environment (and thereby cannot "watch" on what the user may be saying or doing) by disrupting with the camera's operation by, for example, the mechanically and/or digitally introducing noise or other distortion into the signal the camera is detecting and/or communicating to a processor included in the audio-enabled device.

Systems, devices, and methods for disrupting and/or distorting an audio signal received by an audio-activated, a voice-activated device, and/or a so-called "smart" device (for brevity referred to herein as an audio-activated device). Exemplary audio-activated devices include, but are not limited to, mobile phones, tablet computers, home audio-activated devices, Internet of things (IOT) devices, smart home audio-activated devices, and the like. In some embodiments, protecting this disruption and/or distortion may interrupt the audio-activated device's ability to listen in on ambient noise in an environment and understand speech or other audio information that may be included in the ambient noise. Additionally, or alternatively, the systems, devices, and methods disclosed herein may be configured to distort or interrupt visual and/or video recordings of an environment or people within the environment that may be captured by a camera that may be included in a smart device such as a phone or computer.

An exemplary purpose for the systems and devices disclosed herein is to limit an audio-activated device's ability to detect or recognize speech articulated by one or more individuals and/or limit an audio-activated device's ability to detect or recognize aspects of ambient noise (e.g., music a user may be listening to, a movie the user may be watching, or the like). In this way, a user may have increased confidence that their privacy is secure and/or that he or she is not be spied upon by the audio-activated device, even in the event of a data breach or cyber-attack that compromises the functionality and/or privacy settings of the audio-activated device.

In some embodiments, the systems, devices, and methods disclosed herein may be customized to cooperate with, and/or fit on/over a particular audio-activated device 130 and/or an audio-activated device 130 of a particular size, shape, form factor, and/or configuration. For example, if a particular audio-activated device 130 includes multiple microphones to listen to ambient noise, system may include multiple speakers to disrupt the ambient noise received by the multiple microphones. Additionally, or alternatively, the systems, devices, and methods may be configured to cooperate with and/or be responsive to the programming and/or operation of one or more audio-activated devices. In some cases, the systems, devices, and methods may be configured to be updated in order to, for example, improve their operation and/or adapt to changes in the operation of an audio-activated device the systems, devices, and methods are cooperating with.

In some embodiments, the systems, devices, and methods disclosed herein may be configured to interface with user in order to, for example, receive instructions regarding the operation of the device. These instructions may relate to, for example, when to record a user, setting a schedule for when the methods disclosed herein should be performed and/or the audio-activated device should be operable, managing the operation of an auxiliary device (e.g., a light) and/or managing power for an audio-activated device.

In some cases, the systems and devices disclosed herein may not include any Wi-Fi, Bluetooth, radio or other antennas for data transfer. This may serve to isolate the systems and devices disclosed herein from the Internet, which may prevent potential hacking or other intrusion into the processor of the systems and devices disclosed herein via the Internet.

In some embodiments, the systems and/or devices disclosed herein may have be a form factor configured to cooperate with a plurality of different sizes, shaped, and/or types of audio-activated device. For example, one of the systems and/or devices included herein may be configured to cooperate with audio-activated devices ranging in size from a length of 10 cm, a width of 10 cm, and a height of 5 cm to a length of 5 cm, a width of 5 cm, and a height of 3 cm. In another example, the systems and/or devices included herein may be configured to cooperate with cylindrically shaped audio-activated devices ranging in size from, for example, 5-20 cm in height and 3-15 cm in diameter.

In some embodiments, the systems and/or devices disclosed herein may be configured to come into close contact (e.g., within 0.5-5 mm) with all, or a portion of, the audio-activated device on one or more sides. Such close contact may improve the system's ability to sonically isolate a microphone of the audio-activated device from ambient noise and/or visually isolate a camara of the audio-activated device from an environment in which the audio-activated device is situated. Additionally, or alternatively, a form factor of the systems and/or devices disclosed herein may be customized to fit over and/or cooperate with particular shapes, sizes, configuration and/or types of audio-activated device. In these embodiments, the systems and/or devices disclosed herein may be configured so that they minimally increase the overall size of the audio-activated device and system/device combination.

Additionally, or alternatively, in some embodiments, the systems and/or devices disclosed herein may be configured to have one or more adjustable dimensions so that a size and/or shape of the systems and/or devices may be changed by a user. Adjustments to the size and shape of the systems and/or devices may be facilitated by, for example, one or more of a track, an expandable scaffold, and/or an elastic material.

FIG. 1 is a block diagram of an exemplary system 100 for disrupting and/or distorting an ambient noise received by an exemplary audio-activated device 130 that includes a microphone 135. One or more components of system 100 may be included in any of the systems and/or devices disclosed herein. System includes a computer 115 communicatively and electronically coupled to a microphone 110, a power supply 140, a communications and/or power port 150, a feedback mechanism 145, and a speaker 125 resident within a housing 155. Microphone 110 may be configured to receive sound, such as ambient noise 105, and convert that sound into a digital signal that may be communicated to computer 115. In some embodiments, microphone 110 may be a plurality of microphones placed at different locations on and/or within housing 155. Computer 115 may be any computing device configured to execute one or more of the methods disclosed herein. Power supply 140 may be any power supply that is configured to draw electrical power from a main (e.g., power cord) and/or a battery that may be rechargeable. Speaker 125 may be configured to emit a sound signal or audio signal responsively to a signal provided by computer 115. In many embodiments, speaker 125 may be positioned within housing 155 so that when system 100 is used and/or positioned on, or proximate to, audio-activated device 135, speaker 125 is proximate to (e.g., 0.5-1 cm away from), and may project sound e.g., distorted ambient noise or white noise) directly into, microphone 135. The sound projected into microphone 135 may be configured to distort ambient sound received by microphone 135. A close proximity between speaker 125 and microphone 135 may also serve to minimize, or reduce, a volume of the sound necessary to effectively disrupt, or distort, ambient sound received by microphone 135. This may be advantageous to a user who does not desire to hear the distorted ambient sound projected into speaker 135. In addition, soundproofing layer 120 may further reduce the volume of the distorted ambient sound projected into speaker 135 perceived by a user.

In some embodiments housing may include multiple speakers 125 (e.g., one speaker 125 for each microphone 135 resident within an audio-activated device 130). In some embodiments, a type, shape, and/or position of a speaker 125 may be responsive to a design of audio-activated device 130 and/or a type, shape, and/or position of microphone 135 included within audio-activated device 130. On some occasions, audio-activated device 130 may include a plurality of microphones. On these occasions, system 100 may include a corresponding plurality of speakers 125 positioned to correspond to locations of microphones provided by audio-activated device 130.

Housing 155 may be made from any appropriate material including, but not limited to, plastic, vinyl, metal, wood, bamboo, and combinations thereof. In some embodiments of the invention, housing 155 may be configured to affix to an outside surface of audio-activated device 130 via any acceptable means (e.g., a strap, magnets, VELCRO™, etc.) and/or may be configured to fit over audio-activated device 130, or a portion thereof, as a full or partial cover for audio-activated device 130. In some embodiments, a portion of housing 155 maybe flexible and/or adjustable so as to, for example, facilitate encasing audio-activated device 130 for a portion thereof. The flexibility and/or adjustable size and/or shape of housing 155 may be accomplished by, for example, fabric, an expandable scaffold, a flexible material (e.g., elastic or vinyl), or the like.

Optionally, system 100 may include a soundproofing layer or other sound proofing and/or dampening material 120 that may be configured to block transmission of ambient noise to a speaker 135 of audio-activated device 130 and/or isolate sound within housing 155 from speaker 135 thus reducing the audio-activated device's ability to receive, isolate, or process ambient noise, including user commands. The soundproofing materials may be, for example, insulation, acoustic foam, lead foil, paper, foam, and/or acoustic textiles.

Optionally, system 100 may include feedback mechanism 145, which may be configured to provide feedback to a user that the microphone has detected ambient noise that includes an audio trigger and/or that computer 115 has recognized the audio trigger within a signal corresponding to ambient noise that was detected by microphone 110, converted into a digital signal (also referred to herein as an "ambient noise signal") and communicated to computer 115. Exemplary feedback mechanisms 145 include, but are not limited to, lights that may be configured to turn on or off and/or change color responsively to receiving the audio trigger and/or a command (e.g., a command intended to be received by audio-activated device 130 so that audio-activated device may perform an action) from the user and/or a speaker configured to emit a sound responsively to receiving the audio trigger and/or a command from the user.

In some embodiments, system 100 may further include communications and/or power port 150 that may be configured to, for example, couple to a power supply (e.g., an electrical plug and/or transformer) and provide power to power source 140 and/or charge a battery included in power source 140. In some embodiments, communications and/or power port 150 may include a transformer. Additionally, or alternatively, the communications and/or power port 150 may be configured to communicate with one or more external devices (e.g., a computer (not shown)) and/or facilitate communication between an external device and computer 115. Exemplary communications and/or power ports 150 include, but are not limited to, USB ports, micro-USB ports, firewires, USB-C ports, and power coupling ports.

Figure 2A:
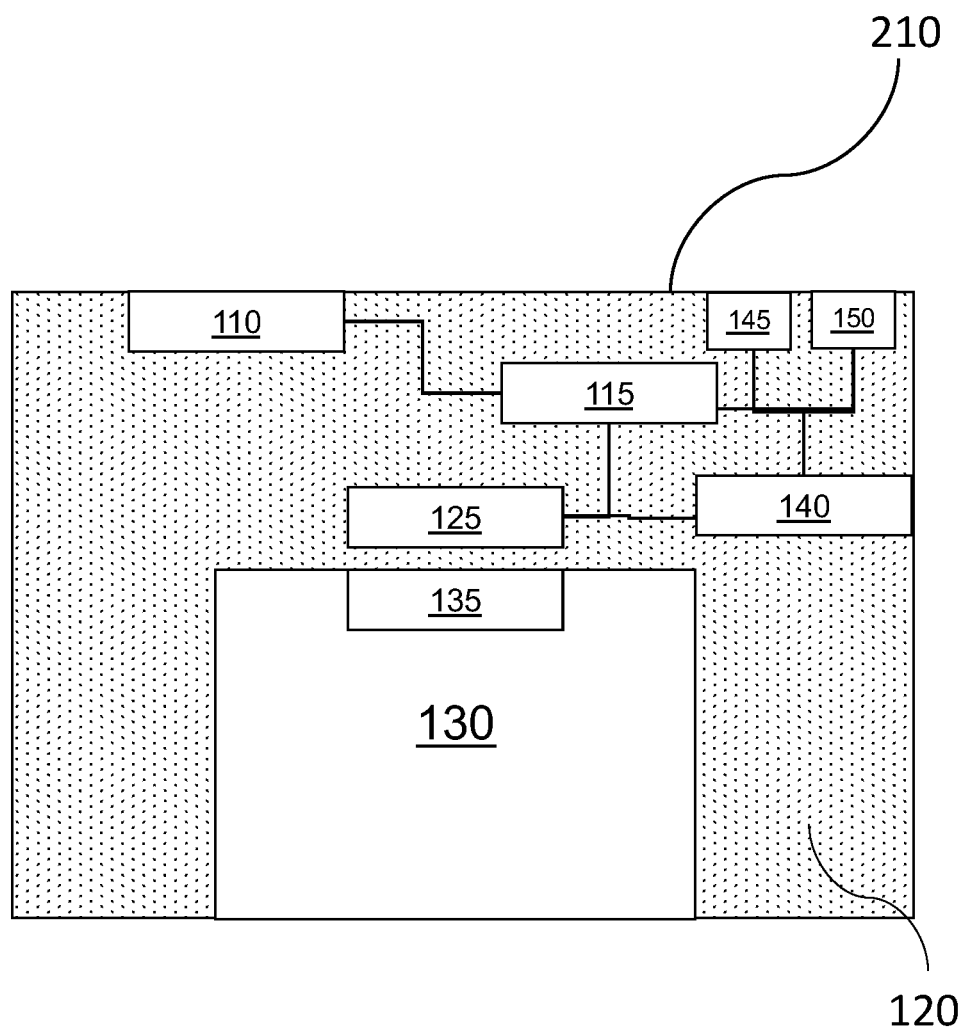
FIG. 2A is a block diagram of an exemplary system that disrupts or distort ambient noise received by an audio-activated device, in accordance with some embodiments of the present invention.

FIGS. 2A-2E are block diagrams of exemplary systems 200, 201, and 202 that disrupt or distort ambient noise received by an audio-activated device like audio-activated device 130 and/or a microphone 135 resident in the audio-activated place 130. Systems 200, 201, and 202 are configured to cover, or encase, all, or a portion of audio-activated device 130 and/or microphone 135 and may include one or more components of system 100. System(s) 200, 201, and/or 202 may be configured to perform one or more processes and/or functions similar to the functions and/or processes performed by system 100. More specifically, FIG. 2A provides a housing 210 that includes microphone 110, computer 115, speaker 125, power source 140, communications and/or power port 150, feedback mechanism 145. Speaker 125 may be positioned within housing 210 so that it is proximate to (e.g., 0.5-1 cm away from), and may project sound directly into, microphone 135. Positioning speaker 125 within housing 210 so that speaker 125 is close to microphone enables speaker 125 to project sound into microphone 135 that effectively distorts ambient sound while reducing the volume of the sound necessary to do so. This may be advantageous to a user who does not which to hear the distorted ambient sound projected into speaker 135. In addition, the soundproofing material of system 200 may further reduce the volume of the distorted ambient sound projected into speaker 135 perceived by a user.

Housing 210 may be made from, and/or include sound proofing and/or dampening material 120 that may be configured and/or arranged to prevent ambient noise from reaching speaker 135 and/or reduce a volume of distorted ambient sound projected into microphone 135 perceived by a user of system 200.

Figure 2B:
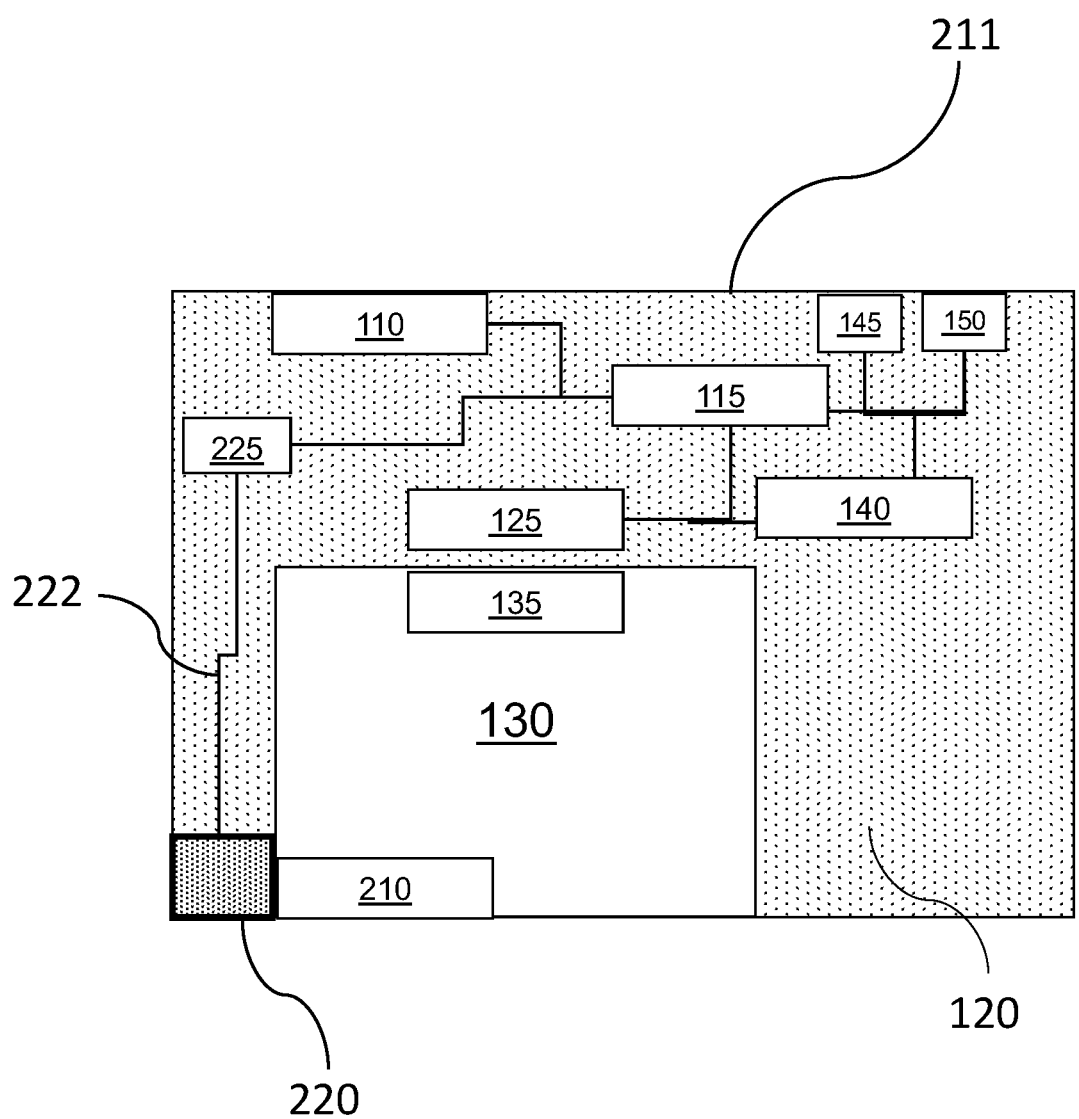
FIG. 2B is a block diagram of an exemplary system including that disrupts or distort ambient noise received by an audio-activated device a shutter that obstructs a camera of the audio-activated device in a closed position, in accordance with some embodiments of the present invention.
Figure 2C:
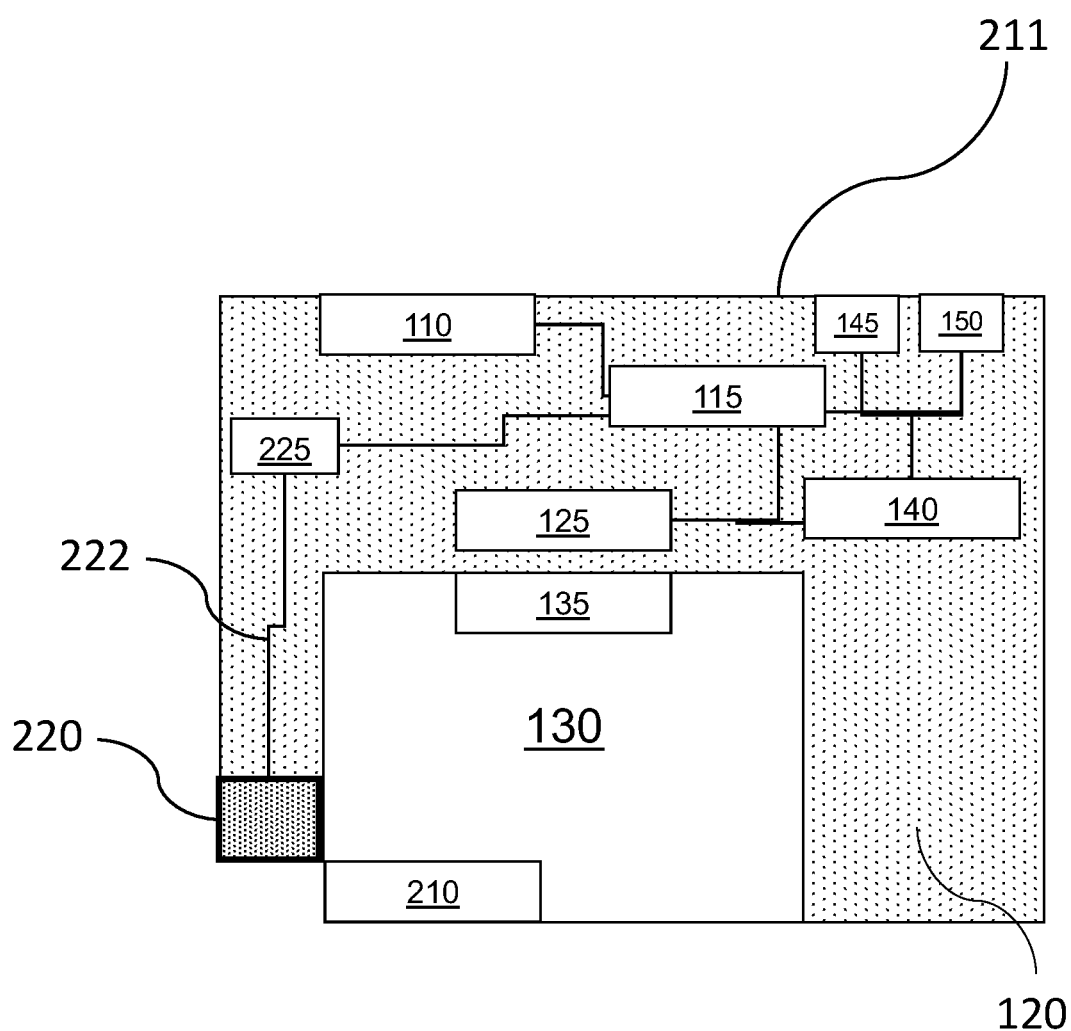
FIG. 2C is a block diagram of an exemplary system that disrupts or distort ambient noise received by an audio-activated device including the shutter in an open position, in accordance with some embodiments of the present invention.

FIGS. 2B and 2C provide block diagrams of a system 201 that includes the components of system 200 and a shutter or door 220 that moves to selectively obstruct a camera 210 included in audio-activated device 130. Shutter 220 may articulate from a closed (obscuring camera 210) position as shown in FIG. 2B to an open position where camera 210 is not obscured as shown in FIG. 2C by way of a track or other mechanism (not shown). In some embodiments, movement of shutter 220 may be facilitated by a motor 225 that acts to articulate shutter 220 from the open to closed position and from the closed to open position via, for example, a wire or cable 222. In some cases, motor 225 may be a stepper motor and/or may include or use one or more of spool, gears, and/or pulleys to facilitate movement of shutter 220 via cable 222.

Figure 2D:
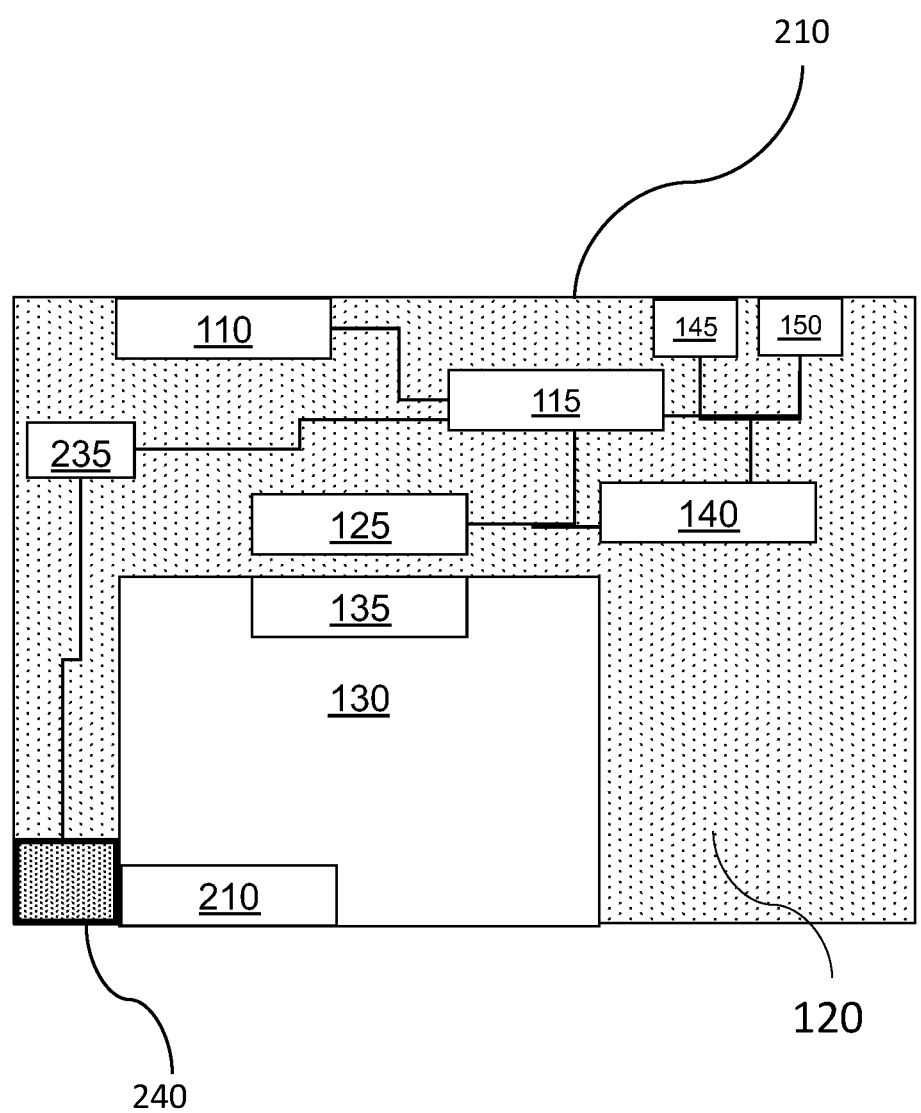
FIG. 2D is a block diagram of an exemplary system that disrupts or distort ambient noise received by an audio-activated device and includes a piece of electrically sensitive material positioned to obstruct a camera when the piece of electrically sensitive material is opaque, in accordance with some embodiments of the present invention.
Figure 2E:
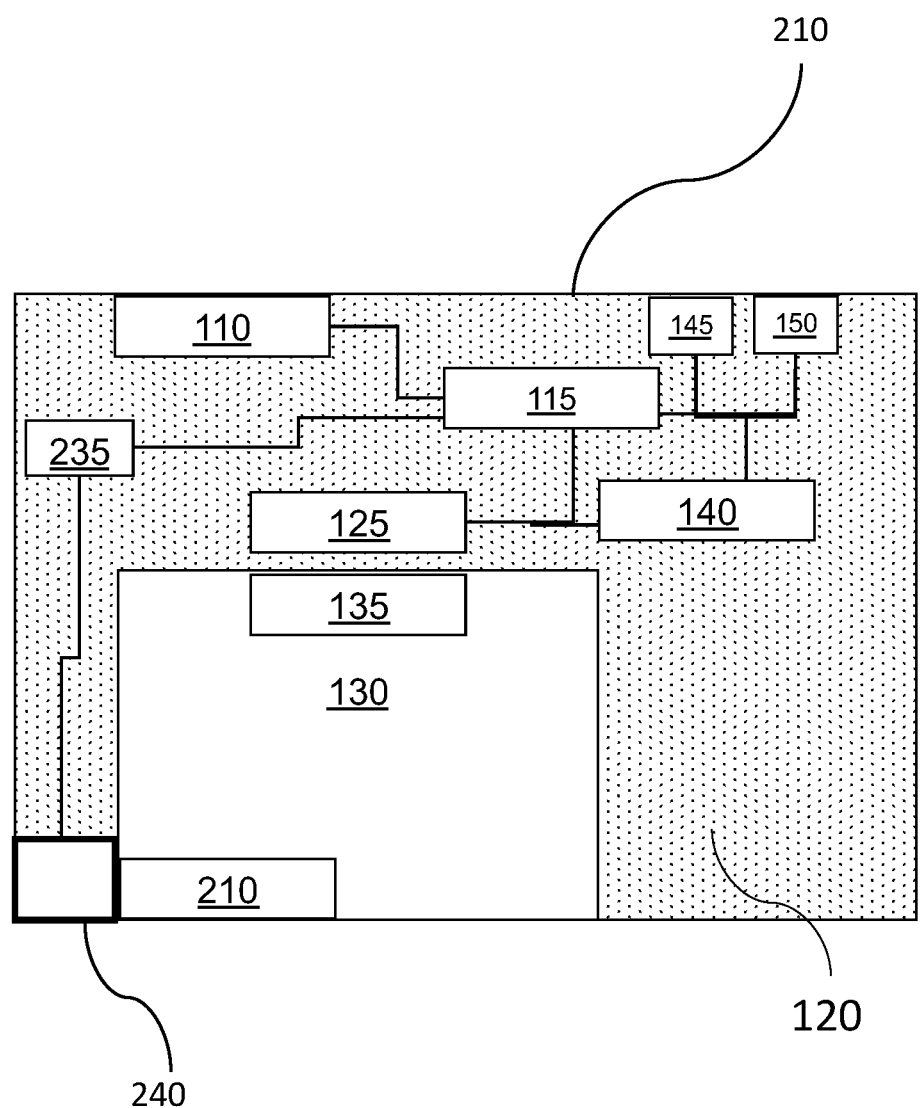
FIG. 2E is a block diagram of an exemplary system that disrupts or distort ambient noise received by an audio-activated device and includes a piece of electrically sensitive material positioned to obstruct a camera when the piece of electrically sensitive material is transparent

FIGS. 2D and 2E provide a block diagrams of a system 202 that includes the components of system 200 and a piece of electrically sensitive material 240 that transitions from being opaque to transparent responsively to application of electrical voltage or current that is supplied by a controller 235 that provides electricity to transition electrically sensitive material 240A from an opaque state as shown in FIG. 2D to a transparent state (electrically sensitive material 240B) as shown in FIG. 2E. Such materials include, but are not limited to smart glass, switchable privacy glass, electrically switchable smart glass, a suspended-particle device, a micro-blind device, and/or an electrochromic device. When electrically sensitive material 240 is opaque as shown in FIG. 2D, it obscures camera 210 so that it cannot capture visual and/or video information. When electrically sensitive material 240 is transparent as shown in FIG. 2E, it does not obscure camera 210. In this state, camera 210 can capture visual and/or video information.

Figure 3A:
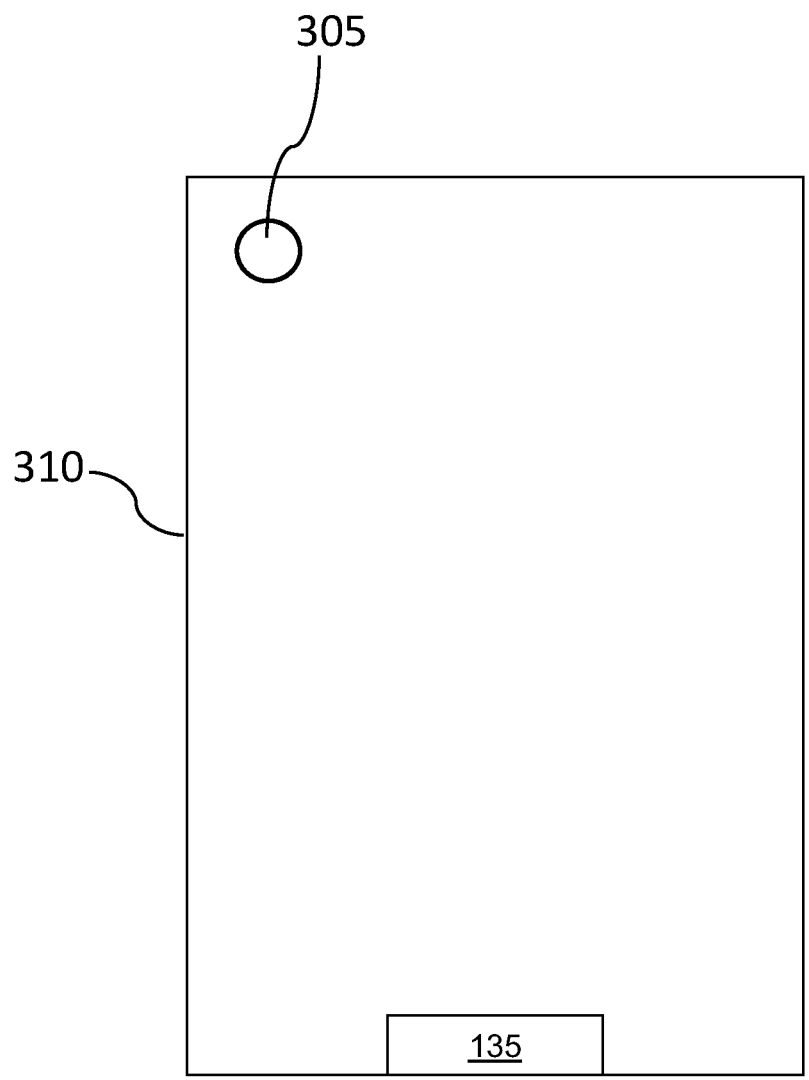
FIG. 3A is a block diagram of an exemplary audio-activated device, in accordance with some embodiments of the present invention.

FIG. 3A is a block diagram of an exemplary audio-activated device 300 embodied as, for example, a mobile phone or tablet computer. Audio-activated device 300 may be similar to audio-activated device 130 and may include a camera 305, a body 310, and a microphone 335. Camera 305 may be forward facing or back facing within device body 310. Body 310 also includes a microphone 135 that may detect ambient noise.

FIGS. 3B-3G provide block diagrams of exemplary systems 310, 311, and 312 respectively, embodied as a case that may fit over and/or encase audio-activated device 300 and/or a portion thereof. Systems 310, 311, and/or 312 may be configured to perform one or more processes and/or functions similar to the functions and/or processes performed by system(s) 100, 200, 201, and/or 202 and may include a housing 315 configured to encase audio-activated device 300 or a portion thereof. In some embodiments, housing 315 may be made from, and/or include sound proofing and/or dampening material like sound proofing and/or dampening material 120. Speaker 125 that may be configured and/or positioned within housing 315 so that it is proximate to microphone 335 and speaker 125 and/or systems 310, 311, and/or 312 may be configured and/or operated to prevent ambient noise from reaching speaker 135 and/or reduce a volume of distorted ambient sound projected into microphone 335 perceived by a user of system systems 310, 311, and/or 312.

Figure 3B:
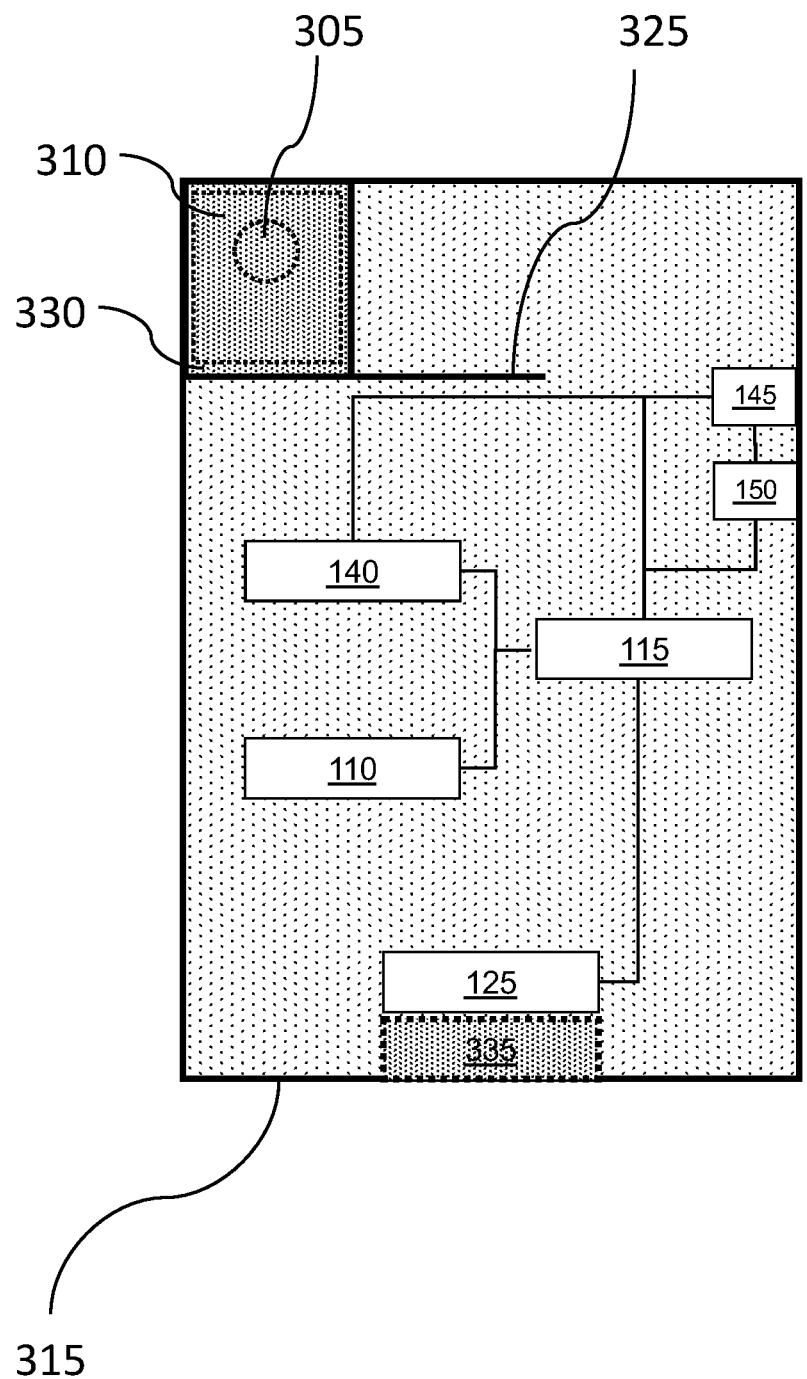
FIG. 3B is a block diagram of an exemplary system that encases an audio-activated device and disrupts or distort ambient noise received by the audio-activated device and includes a manually-operated shutter that obstructs a camera of the audio-activated device in a closed position, in accordance with some embodiments of the present invention.
Figure 3C:
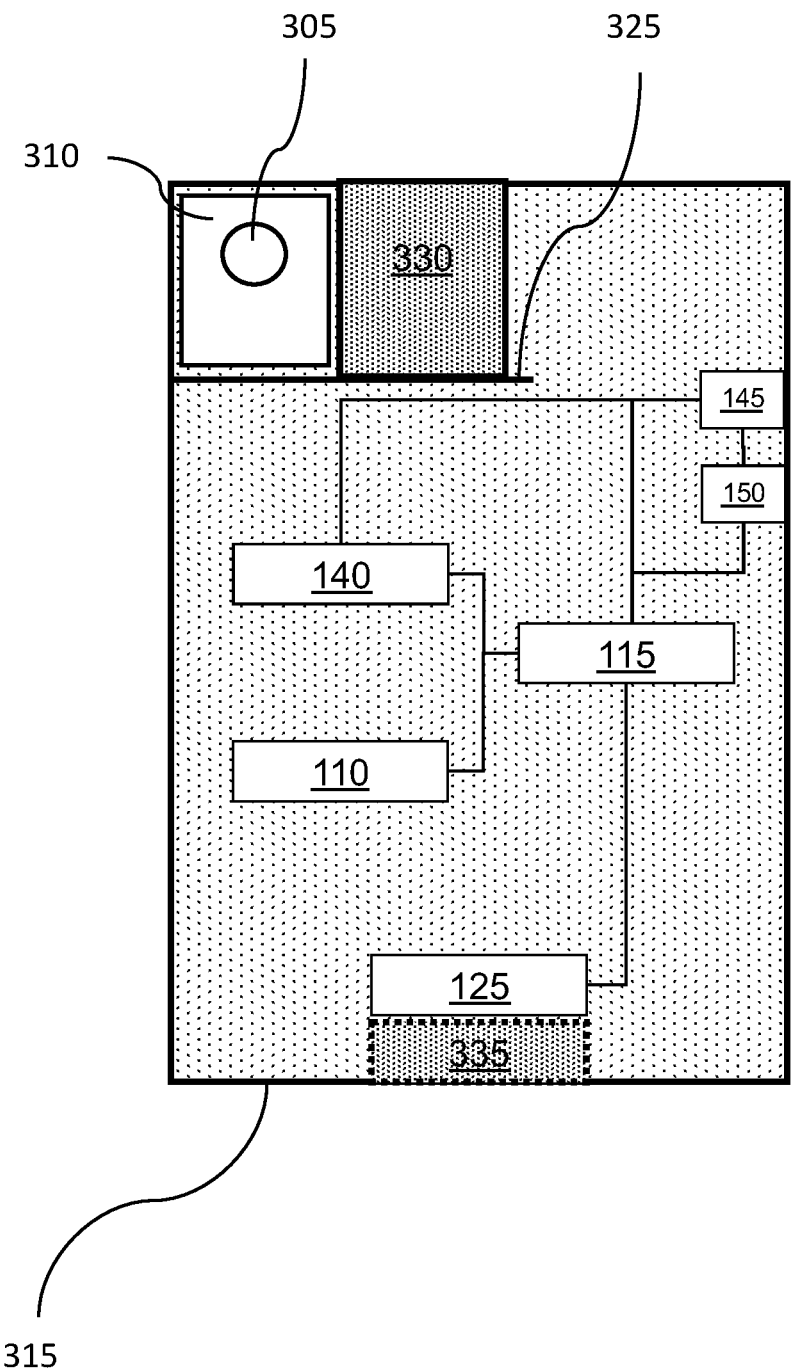
FIG. 3C is a block diagram of an exemplary system that encases an audio-activated device and disrupts or distort ambient noise received by the audio-activated device and includes the manually-operated shutter that obstructs a camera of the audio-activated device in an open position, in accordance with some embodiments of the present invention.

More specifically, FIGS. 3B and 3C provide block diagrams of a system 310 that includes microphone 110, computer 115, speaker 125, power source 140, communications and/or power port 150, feedback mechanism 145, a housing 315, and/or a shutter or door 330 that manually articulates along a track 235 from a closed position covering a portion of body 310 and camera 305 as shown in FIG. 3B to an open position where camera 305 and a portion of body 310 are not obscured as shown in FIG. 3C.

Figure 3D:
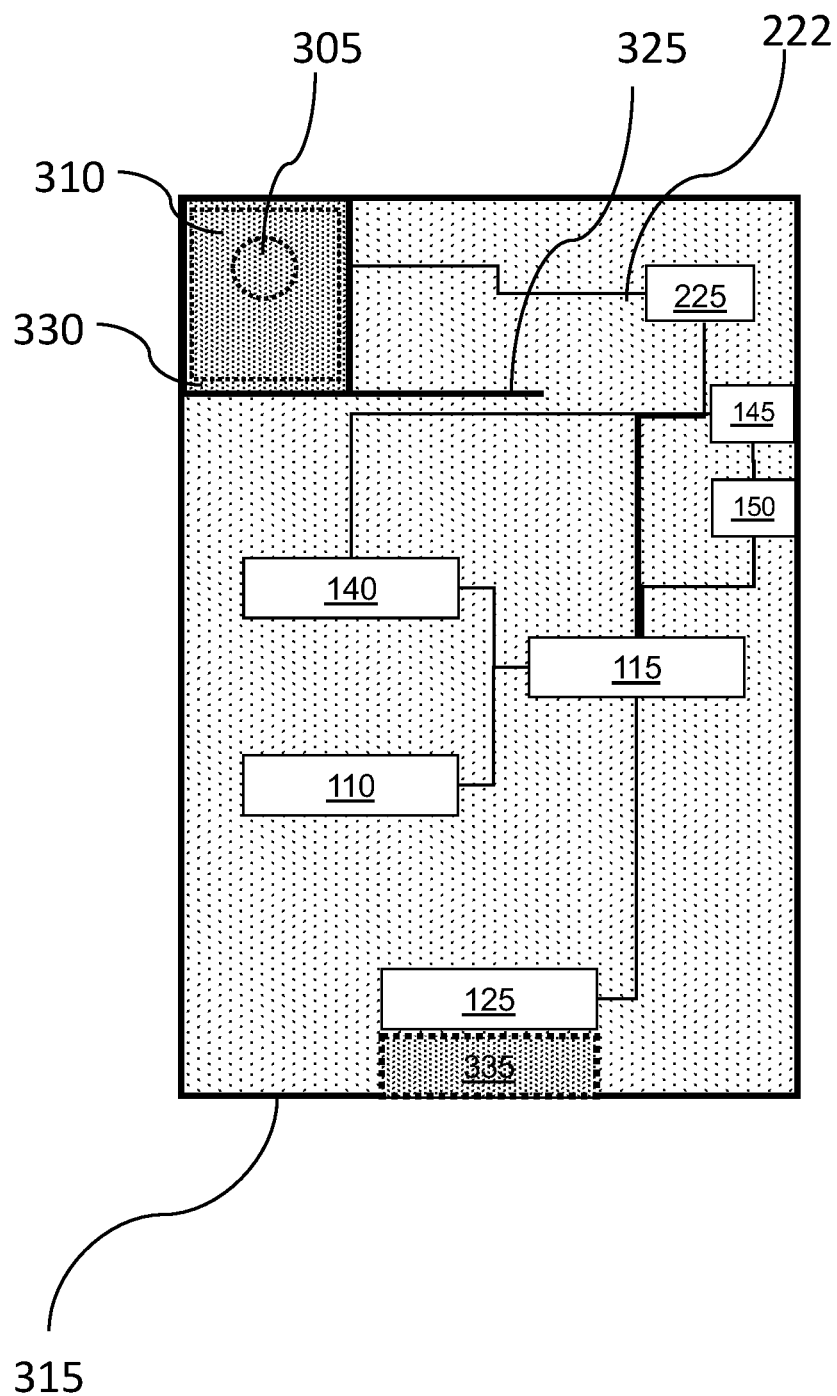
FIG. 3D is a block diagram of an exemplary system that encases an audio-activated device and disrupts or distort ambient noise received by the audio-activated device and includes a shutter that obstructs a camera of the audio-activated device in a closed position, in accordance with some embodiments of the present invention.
Figure 3E:
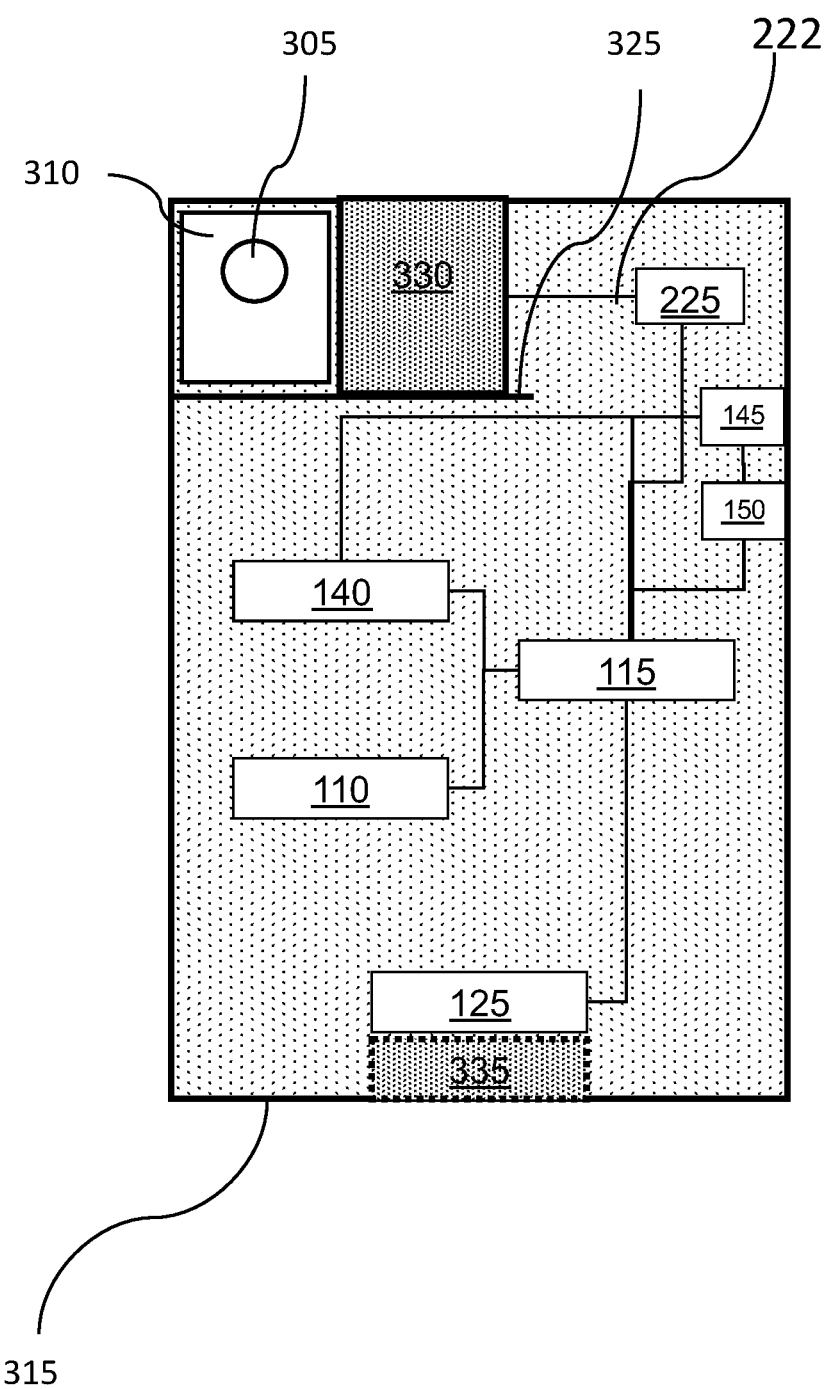
FIG. 3E is a block diagram of an exemplary system that encases an audio-activated device and disrupts or distort ambient noise received by the audio-activated device and includes the shutter that obstructs a camera of the audio-activated device in an open position, in accordance with some embodiments of the present invention.

In some embodiments, as shown in FIGS. 3D and 3E, movement of shutter 330 along track 235 within a case 312 may be facilitated by a motor 225 that acts to articulate shutter 330 from the closed position (shown in FIG. 3D) to an open position (shown in FIG. 3E) and vice-versa via, for example, a wire or cable 222. In some cases, motor 225 may be a stepper motor and/or may include or use one or more of spool, gears, and/or pulleys to facilitate movement of shutter 330 via cable 222.

Figure 3F:
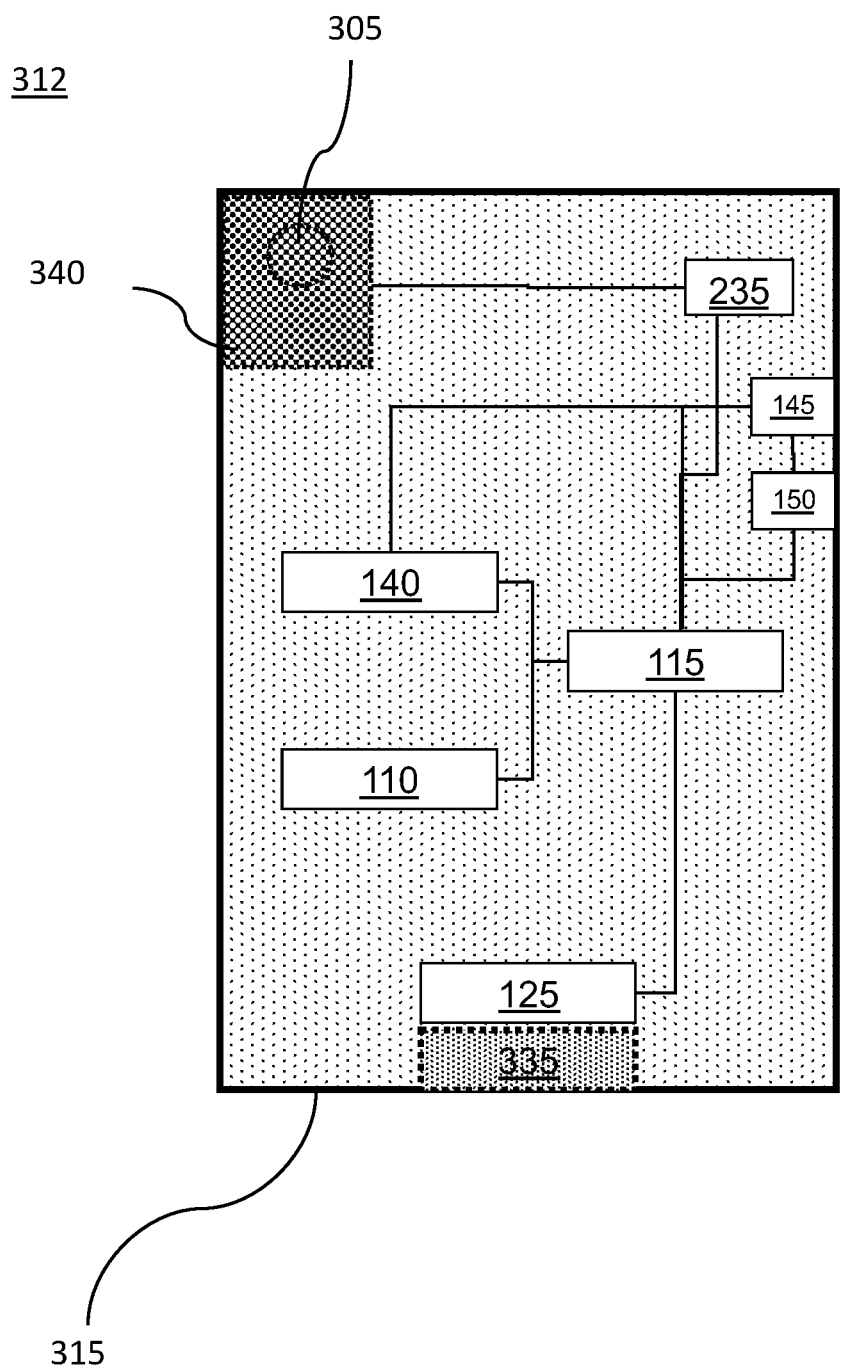
FIG. 3F is a block diagram of an exemplary system that encases an audio-activated device and disrupts or distort ambient noise received by the audio-activated device and includes a piece of electrically sensitive material positioned to obstruct a camera when the piece of electrically sensitive material is opaque, in accordance with some embodiments of the present invention.
Figure 3G:
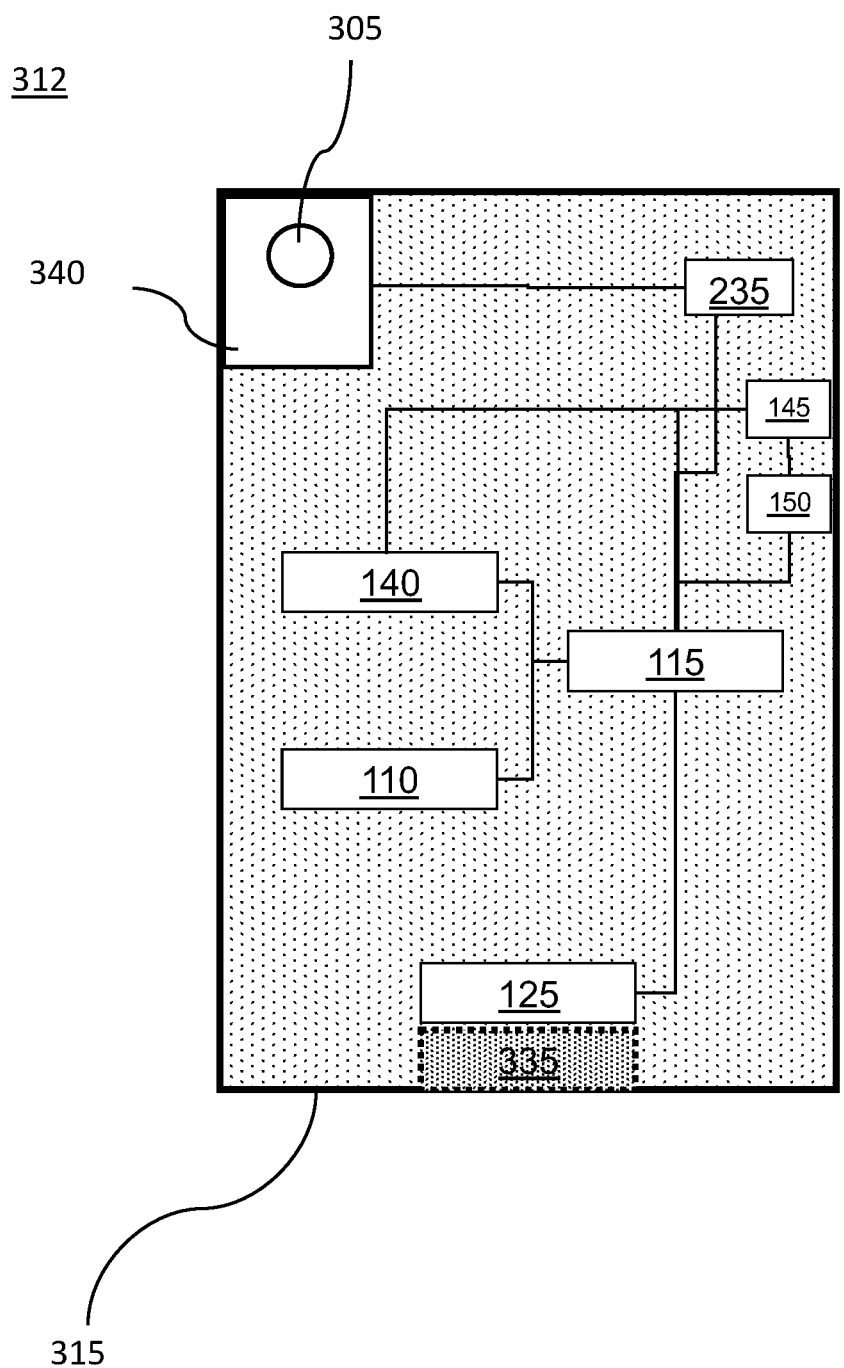
FIG. 3G is a block diagram of an exemplary system that encases an audio-activated device and disrupts or distort ambient noise received by the audio-activated device and includes a piece of electrically sensitive material positioned to obstruct a camera when the piece of electrically sensitive material is transparent, in accordance with some embodiments of the present invention.

FIGS. 3F and 3G provide a block diagrams of a system 202 that includes a piece of electrically sensitive material 340 that transitions from being opaque to transparent responsively to application of electrical voltage or current that is supplied by a controller 235 that provides electricity to transition electrically sensitive material 340 from an opaque state as shown in FIG. 3F to a transparent state (electrically sensitive material 340) as shown in FIG. 3G. Such materials include, but are not limited to smart glass, switchable privacy glass, electrically switchable smart glass, a suspended-particle device, a micro-blind device, and/or an electrochromic device. When electrically sensitive material 340 is opaque as shown in FIG. 3F, it obscures camera 305 so that it cannot capture visual and/or video information. When electrically sensitive material 340 is transparent as shown in FIG. 3G, it does not obscure camera 305. In this state, camera 305 can capture visual and/or video information.

Figure 4:
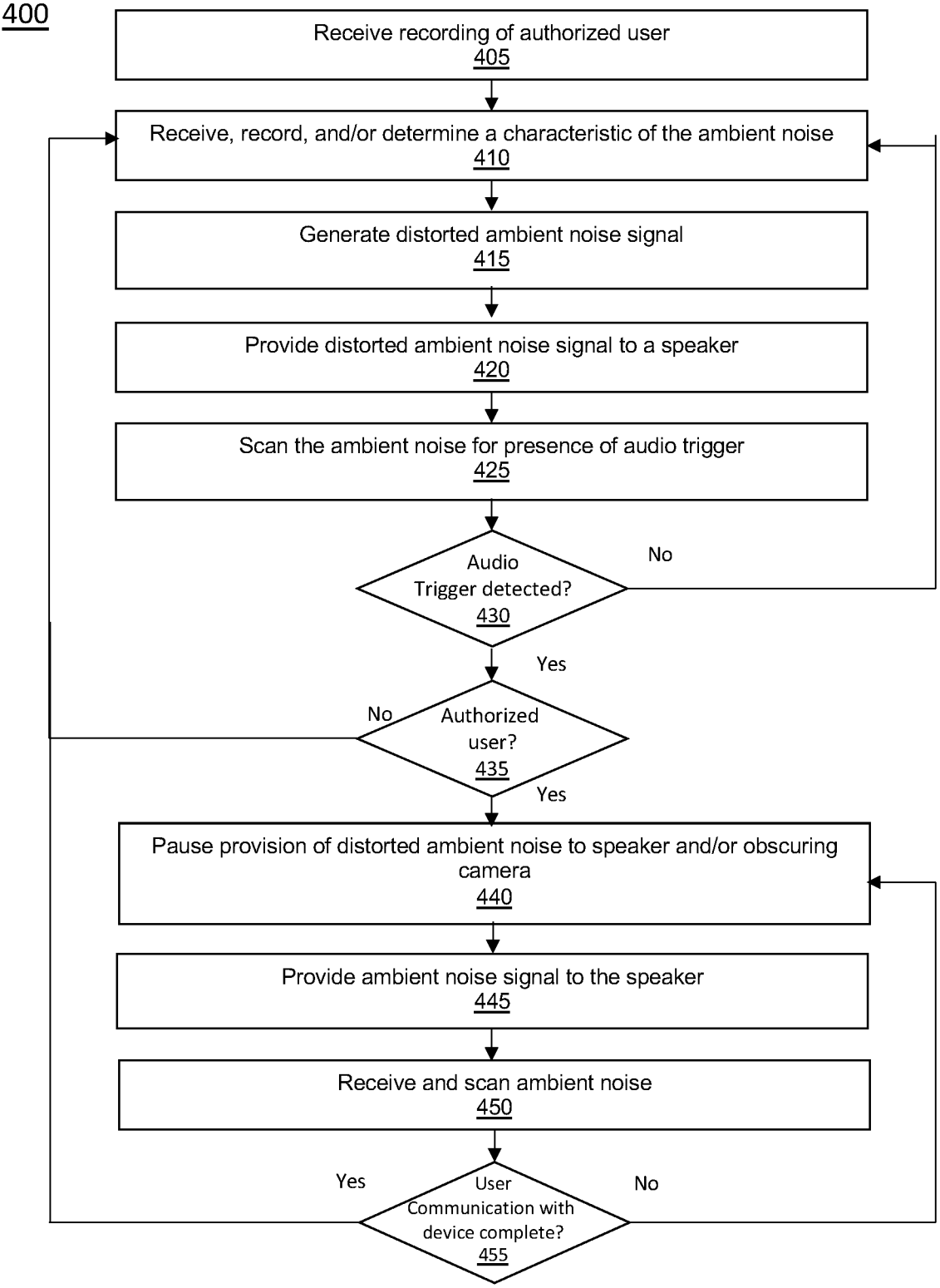
FIG. 4 is a flowchart of an exemplary process for selectively distorting and/or disrupting ambient noise that may be detected by a microphone of an audio-activated device, in accordance with some embodiments of the present invention.

FIG. 4 is a flowchart of an exemplary process 400 for selectively distorting and/or disrupting ambient noise that may be detected by a microphone of an audio-activated device, such as audio-activated device 130, phone 300, and a computer. Process 400 may be executed by, for example, systems and/or devices disclosed herein and/or components thereof. For example, process 400 may be executed by system 100, 200, 201, and/or 202, and/or cases 301, 311, and/or 312 and/or components thereof.

Optionally, in step 405, a recording of an authorized user may be received. In the recording, the user may make a sound corresponding to an audio trigger for the system/device executing process 400. Exemplary audio triggers include, but are not limited to, spoken words, phrases, and/or noises (e.g., clicks, whistling, etc.). Other exemplary audio triggers include, but are not limited to, sounds that may be generated by, for example, a user interacting with an object and/or his or her environment (e.g., banging on a countertop, blowing a whistle, snapping, clapping, closing a door, etc.).

In step 410, an ambient noise signal may be received and, in some instances, may be recorded. In some embodiments, a characteristic of the ambient noise may also be determined in step 410. Exemplary characteristics of the ambient noise include, but are not limited to, volume, amplitude, and/or a frequency (or a range of frequencies) included within the ambient sound. When the ambient noise is recorded, it may be recorded in a buffer. At times, the recording may be for a relatively short period of time (e.g., 30 seconds, 2 minutes, 10 minutes) that is written over periodically, continuously and/or as-needed. The ambient noise may be received from a microphone such as microphone 110, which may translate the ambient noise it detects into a digital signal that may be communicated to a processor that receives the ambient noise signal in step 410.

In step 415, a distorted ambient noise signal may be generated using the received and/or recorded ambient noise signal. The distorted ambient noise signal may be generated by, for example, applying a distortion algorithm to the ambient noise, filtering the ambient noise to remove certain frequencies and/or amplitudes of sound, introduction of noise (e.g., white noise) into the ambient noise and/or application of changes in frequency, amplitude, duration, and/or completeness of the ambient sound via, for example, sampling, overlaying snippets of sound over the ambient noise, deleting portions of the ambient noise (e.g., deleting 0.1 s of ambient noise for every second of ambient noise received and/or randomly or pseudo-randomly deleting portions of the ambient noise signal) and/or inserting noise or sound into the ambient noise signal. In some embodiments, generating the distorted ambient noise signal may include setting minimum and/or maximum thresholds for certain parameters (e.g., amplitude, frequency) of the audio signal output by the systems and devices disclosed herein. In some embodiments, execution of step 415 may include randomly and/or pseudo-randomly changing how the ambient noise is distorted at various times so that it is difficult or impossible for an audio-activated device to reverse-engineer, or undistort, the distorted ambient noise signal so that the audio-activated device may be able to effectively "listen" to the ambient noise within an environment and, for example, extract the actual, correct ambient noise signal from the distorted ambient noise signal.

In step 420, the distorted ambient noise signal may be provided to a speaker so that the speaker generates sound corresponding to the distorted ambient noise. In many cases, the speaker will be positioned proximate to a microphone of the audio-activated device so that the microphone of the audio-activated device detects the distorted ambient noise signal instead of, or in addition to, the actual ambient noise in an environment. In this way, the distorted ambient noise emitted by the speaker may disrupt and/or invalidate the ability of the microphone of the audio-activated device to accurately detect ambient noise in an environment.

In some embodiments, a manner in which the ambient noise signal is generated (step 415) and/or how the ambient noise is provided to the speaker (step 420), and/or an operation of the speaker when emitting sound responsively to receiving the distorted ambient noise signal may be responsive to a characteristic of the ambient noise determined in step 410. For example, when the determined characteristic of the ambient noise is a volume of the ambient noise, a magnitude for the volume, typically in decibels, may be determined in step 415. The determined volume may then be used to determine a volume for the distorted ambient noise signal provided to the speaker and/or an amount of electrical power provided to the speaker so that it may produce distorted ambient noise of a volume sufficient to distort and/or disrupt ambient noise from the environment that may be received by a microphone of an audio-activated device like microphone 135 and/or 335 and/or prevent the microphone of the audio-activated device from detecting ambient noise in an environment with sufficient clarity that it may be analyzed and/or understood by the audio-activated device. In this way, the volume of the distorted ambient sound may be responsive to the volume of ambient noise in an environment so that it may not be perceived by a user or may be barely perceived by the user (e.g., 0.1-10 dB), of the system executing process 400 and execution of process 400 may be successful while being sufficiently loud to distort the ambient sound received by a microphone of the audio-activated device. When the system executing process 400 includes soundproofing and/or sound dampening material, this material may serve to further reduce the volume of the distorted ambient noise signal perceptible to the user.

In another example, the determined characteristic of the ambient noise is an amplitude, range of amplitude, frequency, and/or range of frequencies of the ambient noise. In these instances, a frequency and/or amplitude of the distorted ambient noise signal may be responsive to a determined frequency and/or amplitude of the ambient noise so that the frequency and/or amplitude of the distorted ambient noise may cancel out and/or sufficiently distort the ambient noise received by the microphone of the audio-activated device so that the audio-activated device cannot interpret the ambient noise it receives in order to, for example, detect speech, music, and/or a voice command present within the ambient noise.

In step 425, the ambient noise signal may be scanned, or processed, to detect the presence of an audio trigger (step 430). In some embodiments, a recording of the audio trigger may have been received in step 405 and, in these instances, execution of step 425 may include scanning the ambient noise signal for a pattern that resembles the recording of the audio trigger. Additionally, or alternatively, execution of step 425 may include scanning the ambient audio signal for the presence of a word or phrase using speech and/or pattern recognition algorithms. At times, the audio trigger may be a known audio trigger or phrase that, when spoken by a user, awakens the audio-activated device and/or triggers an action (e.g., playing music or turning on a light) by the audio-activated device.

When an audio trigger is not detected (step 430), steps 410-430 may be repeated. Optionally, when the audio trigger is detected (step 430), it may be determined whether the user speaking or providing the audio trigger is an authorized user of the system executing process 400 and/or the audio-activated device. In some cases, the determination of step 435 may include running a voice recognition algorithm to determine whether a voice associated with the audio trigger is an authorized user. Additionally, or alternatively, the determination of step 435 may include a determination of whether the audio trigger includes and/or is otherwise associated with a code or personal-identification number (PIN) that is associated with an authorized user.

When the audio trigger is detected and, optionally when the user is authorized, provision of the distorted ambient noise signal to the speaker may be paused (step 440) so that ambient noise signal may be communicated to the speaker so that the speaker may produce sound corresponding to the ambient noise signal (step 445).

In this way, words, commands, or other portions of the ambient noise signal that may trigger one or more actions of the audio-activated device may be communicated to the audio-activated device in a fashion that does not disrupt the normal operation of the audio-activated device once the audio trigger is detected. Therefore, the user's privacy may be protected except when the user is deliberately interacting with the audio-activated device.

In some embodiments, the system executing process 400 may include one or more devices to obscure a camera such as shutter or door like shutters 220, 330, and/or a piece of electrically sensitive material like piece of electrically sensitive material 240 and/or 340. In these embodiments, the obscuring of the camera may be paused during execution of step 440 by, for example, moving the shutter/door and/or providing and/or withdrawing electrical current or voltage to the piece of electrically sensitive material.

While the undistorted ambient noise signal is provided to the speaker, an ambient noise signal may continue to be received and scanned in a manner similar to execution of steps 405 and 425 to determine whether user communication with the audio-activated device is complete (step 455). User communication with the audio-activated device may be complete when, for example, the scanning of the ambient noise signal indicates that speech or other audio signals are no longer present and/or when an audio trigger understood to conclude the user's communication with the audio-activated device is determined to be present in the ambient noise signal. At times, the audio trigger understood to conclude the user's communication with the audio-activated device may be configured by the user when, for example, setting up the system executing process 400.

When user communication with the audio-activated device is complete, process 400 may proceed to step 410. When user communication with the audio-activated device is not complete, process 400 may proceed to step 440 and the provision of the distorted ambient noise and/or obscuring of the camera may continue until user communication with the audio-activated device is complete.

Figure 5:
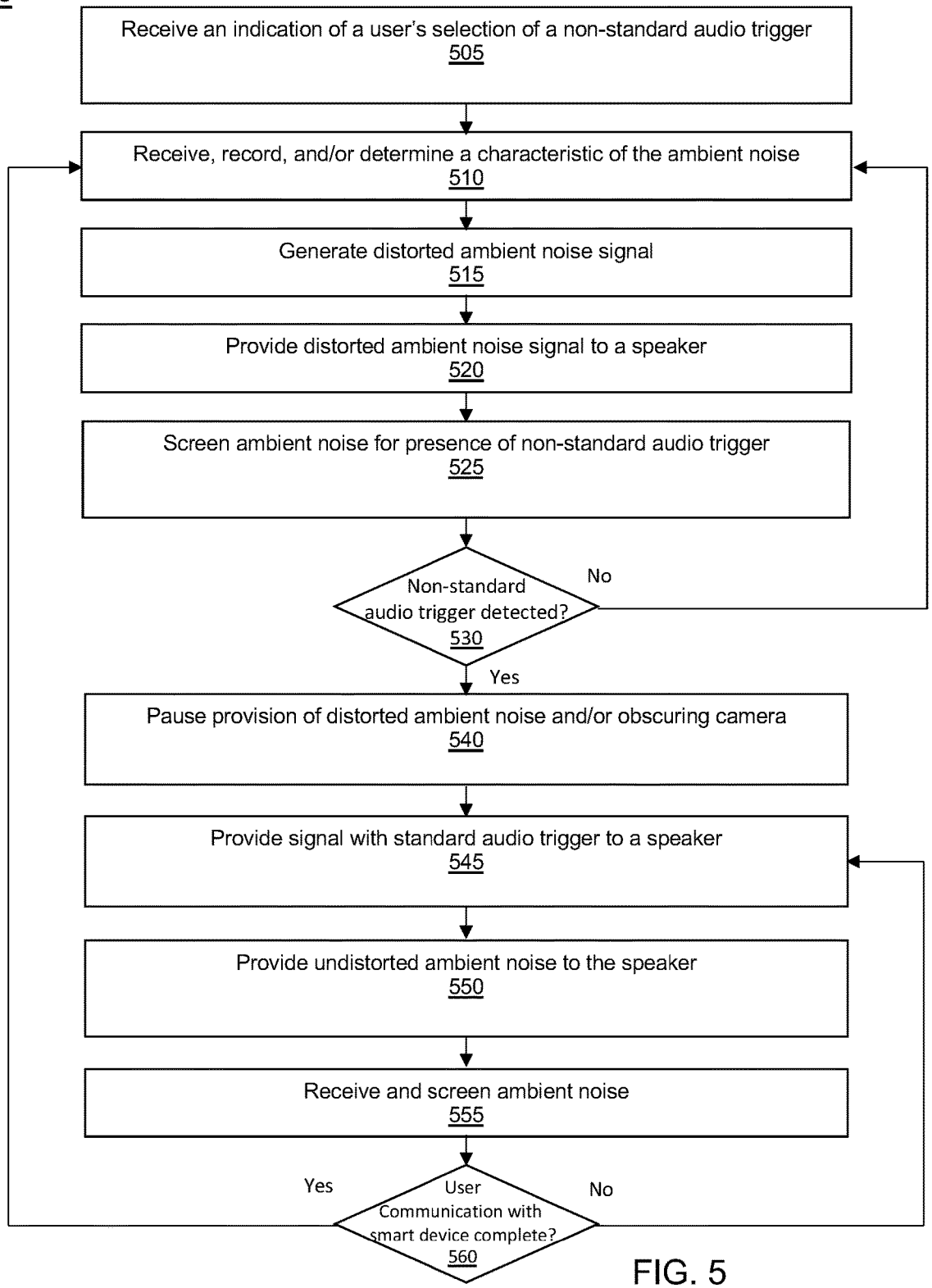
FIG. 5 is a flowchart of an exemplary process for selectively disrupting and/or distorting ambient noise that may be detected by a microphone of an audio-activated device, in accordance with some embodiments of the present invention.

FIG. 5 is a flowchart of an exemplary process 500 for selectively distorting and/or disrupting ambient noise that may be detected by a microphone of an audio-activated device, such as audio-activated device 130, phone 300, and a computer. Process 500 may be executed by, for example, systems and/or devices disclosed herein and/or components thereof. For example, process 500 may be executed by system 100, 200, 201, and/or 202, and/or cases 301, 311, and/or 312 and/or components thereof.

In step 505, an indication of a user's selection of a non-standard audio trigger for the audio-activated device may be received. The non-standard audio trigger may be any audio trigger not typically associated with activating the audio-activated device. For example, if a known, or standard, audio trigger for an audio-activated device is the spoken word "orange" then, the non-standard audio trigger may be any audio trigger that is not the spoken word "orange." At times, the indication of the non-standard audio trigger may be a recording of the user speaking the non-standard audio trigger. Additionally, or alternatively, the user may input the non-standard audio trigger via a user interface of the system executing process 500 (e.g., a keyboard, touchscreen, or mouse). In some cases, the system executing process 500 may provide the user with one or more pre-programmed non-standard audio triggers he or she may select from. For example, the system executing process 500 may provide the user with 3-5 words or phrases to choose from that the user may speak that will act as a non-standard audio trigger.

In step 510, an ambient noise signal may be received and, in some instances, may be recorded. In some embodiments, a characteristic of the ambient noise may also be determined in step 510. Exemplary characteristics of the ambient noise include, but are not limited to, volume, amplitude, and/or a frequency (or a range of frequencies) included within the ambient sound. When the ambient noise is recorded, it may be recorded in a buffer. At times, the recording may be for a relatively short period of time (e.g., 30 seconds, 2 minutes, 10 minutes) that is written over periodically, continuously and/or as-needed. The ambient noise may be received from a microphone such as microphone 135, which may translate the ambient noise it detects into a digital signal that may be communicated to a processor that receives the ambient noise signal in step 510.

In step 515, a distorted ambient noise signal may be generated using the received and/or recorded ambient noise signal. Execution of step 515 may be similar to execution of step 415.

In step 520, the distorted ambient noise signal may be provided to a speaker so that the speaker generates sound corresponding to the distorted ambient noise. In many cases, the speaker will be positioned proximate to a microphone of the audio-activated device so that the microphone of the audio-activated device detects the distorted ambient noise signal instead of, or in addition to, the actual ambient noise in an environment. In this way, the distorted ambient noise emitted by the speaker may disrupt and/or invalidate the ability of the microphone of the audio-activated device to accurately detect ambient noise in an environment.

As will process 400, in some embodiments, a manner in which the ambient noise signal is generated (step 515) and/or how the ambient noise is provided to the speaker (step 520), and/or an operation of the speaker when emitting sound responsively to receiving the distorted ambient noise signal may be responsive to a characteristic of the ambient noise determined in step 510

In step 525, the ambient noise signal may be scanned, or processed, to detect the presence of the non-standard audio trigger (step 530). In some embodiments, execution of step 525 may include scanning the ambient noise signal for a pattern that resembles the recording of the non-standard audio trigger. Additionally, or alternatively, execution of step 525 may include scanning the ambient audio signal for the presence of the non-standard audio trigger using speech and/or pattern recognition algorithms.

When the non-standard audio trigger is not detected (step 530), steps 510-430 may be repeated. Optionally, when the non-standard audio trigger is detected execution of step 530 may include determining whether the user speaking or providing the non-standard audio trigger is an authorized user of the system executing process 500 and/or the audio-activated device. In some cases, this may include running a voice recognition algorithm to determine whether a voice associated with the audio trigger is an authorized user. Additionally, or alternatively, the determination of whether the user is authorized may include a determination of whether the audio trigger includes and/or is otherwise associated with a code or personal-identification number (PIN) that is associated with an authorized user.

When the non-standard audio trigger is detected and, optionally when the user is authorized, provision of the distorted ambient noise signal to the speaker may be paused (step 540) so that the speaker may be provided with a signal that causes the speaker to emit sound corresponding to the standard audio trigger (step 545). Continuing the example above, execution of step 545 may include providing the speaker with a signal so that the speaker emits sound corresponding to the word "orange."

In some embodiments, recording used to generate the signal with the standard audio trigger may be a single recording of the audio trigger, one of multiple recordings of the audio trigger, and/or may be algorithmically generated. In some embodiments, the signal with the audio trigger may be generated using a randomized and/or pseudo-randomized method of combining one or more recordings of the user speaking/making the standard audio trigger so that, for example, there are slight changes to the audio profile of the standard audio trigger at different times when process 500 is executed. These slight changes may be modeled/introduced into the audio signal of the audio trigger to simulate and/or approximate variations in the way a user says/makes the standard audio trigger any given time they use the audio-activated device. This may serve to, for example, inhibit the audio-activated device's ability to selectively ignore instances of when the standard audio trigger is detected in an audio signal detected by the audio-activated device's microphone.

Then, in step 550, an undistorted ambient noise signal may be communicated to the speaker so that the speaker may produce sound corresponding to the ambient noise signal. In this way, words, commands, or other portions of the ambient noise signal that may trigger one or more actions of the audio-activated device may be communicated to the audio-activated device in a fashion that does not disrupt the normal operation of the audio-activated device once the audio trigger is detected. Therefore, the user's privacy may be protected except when the user is deliberately interacting with the audio-activated device.

In some embodiments, the system executing process 500 may include one or more devices to obscure a camera such as shutter or door like shutters 220, 330, and/or a piece of electrically sensitive material like piece of electrically sensitive material 240 and/or 340. In these embodiments, the obscuring of the camera may be paused during execution of step 540 by, for example, moving the shutter/door and/or providing and/or withdrawing electrical current or voltage to the piece of electrically sensitive material.

While the undistorted ambient noise signal is provided to the speaker, an ambient noise signal may continue to be received and scanned in a manner similar to execution of steps 505 and 525 to determine whether user communication with the audio-activated device is complete (step 555). User communication with the audio-activated device may be complete when, for example, the scanning of the ambient noise signal indicates that speech or other audio signals are no longer present and/or when an audio trigger understood to conclude the user's communication with the audio-activated device is determined to be present in the ambient noise signal. At times, the audio trigger understood to conclude the user's communication with the audio-activated device may be configured by the user when, for example, setting up the system executing process 500.

When user communication with the audio-activated device is complete, process 500 may proceed to step 510. When user communication with the audio-activated device is not complete, process 500 may proceed to step 540 and the provision of the distorted ambient noise and/or obscuring of the camera may continue until user communication with the audio-activated device is complete.

In some embodiments, execution of 500 and/or a portion thereof may prevent the audio-activated device from selectively ignoring a pre-recorded sample of the standard audio trigger that may be generated by the system executing process 500 and/or received from the user in, for example, step 505. For example, a single, universal audio recording of the standard audio trigger could be isolated by the audio-activated device's algorithm's and ignored, thus rendering the systems and devices disclosed herein useless as it would be unable to wake the audio-activated device to execute user commands. A single recording of the user speaking the standard audio trigger could similarly be ignored by the audio-activated device thereby rendering the audio-activated device useless. Process 500 may overcome these potential problems by using a recording of the user speaking (or otherwise making) the standard audio trigger, which is provided to the audio-activated device in step 545, instead of using a pre-recorded universal recording of the audio trigger that could be recognized across multiple audio-activated devices used by multiple different users.

Figure 6:
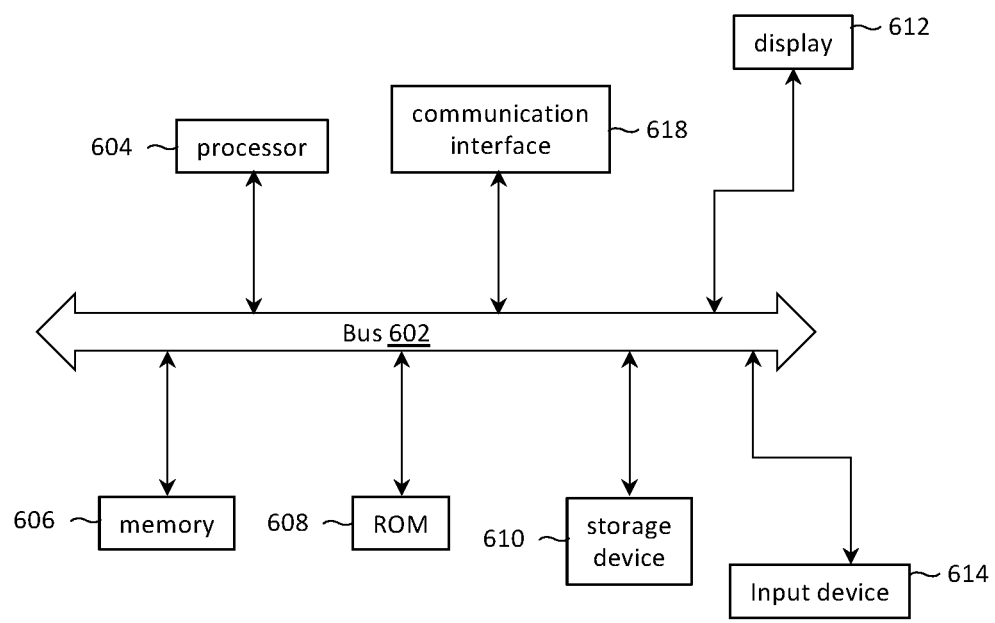
FIG. 6 is a block diagram showing exemplary components of computer/computer system, in accordance with some embodiments of the present invention.

FIG. 6 is a block diagram showing exemplary components of computer/computer system 115 includes a bus 602 or other communication mechanism for communicating information, and a processor 604 coupled with the bus 602 for processing information. Computer system 115 also includes a main memory 606, such as a random-access memory (RAM) or other dynamic storage device, coupled to the bus 602 for storing information and instructions to be executed by processor 604. Main memory 606 also may be used for storing temporary variables or other intermediate information during execution of instructions to be executed by processor 604. Computer system 115 further includes a read only memory (ROM) 608 or other static storage device coupled to the bus 602 for storing static information and instructions for the processor 604. A storage device 610, for example a hard disk, flash memory-based storage medium, or other storage medium from which processor 604 can read, is provided and coupled to the bus 602 for storing information and instructions (e.g., operating systems, applications programs and the like).

Computer system 115 may be coupled via the bus 602 to a display 612, such as a flat panel display, for displaying information to a computer user. An input device 614, such as a keyboard (which may be provided via a touch screen of display 612) including alphanumeric and other keys, may be coupled to the bus 602 for communicating information and command selections to the processor 604. Another type of user input device is cursor control device, such as a mouse, a track pad, or similar input device for communicating direction information and command selections to processor 604 and for controlling cursor movement on the display 612. Other user interface devices, such as microphones, speakers, etc. are not shown in detail but may be involved with the receipt of user input and/or presentation of output.

The processes referred to herein may be implemented by processor 604 executing appropriate sequences of computer-readable instructions contained in main memory 606. Such instructions may be read into main memory 606 from another computer-readable medium, such as storage device 610, and execution of the sequences of instructions contained in the main memory 606 causes the processor 604 to perform the associated actions. In alternative embodiments, hard-wired circuitry or firmware-controlled processing units may be used in place of or in combination with processor 604 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 115 or similar electronic computing device, that manipulates and transforms data represented as physical (electronic) quantities within its registers and memories into other data similarly represented as physical quantities within its memories or registers or other such information storage, transmission or display devices.

Computer system 115 also includes a communication interface 618 coupled to the bus 602. Communication interface 618 may provide a two-way data communication channel with a computer network, which provides connectivity to and among the various computer systems discussed above. For example, communication interface 618 may be a local area network (LAN) card to provide a data communication connection to a compatible LAN, which itself is communicatively coupled to the Internet through one or more Internet service provider networks. The precise details of such communication paths are not critical to the present invention. What is important is that computer system 115 can send and receive messages and data through the communication interface 618 and in that way communicate with hosts accessible via the Internet. It is noted that the components of system 115 may be located in a single device or located in a plurality of physically and/or geographically distributed devices.

We claim:

1. A method comprising:
receiving, by a processor, an ambient noise signal from a microphone communicatively coupled to the processor;
generating, by the processor, a distorted ambient noise signal using the ambient noise signal;
communicating, by the processor, the distorted ambient noise signal to a speaker communicatively coupled to the processor, the speaker being proximate to a microphone of an audio-activated device; and
scanning, by the processor, the ambient noise signal for an audio trigger included therein, wherein upon detection of the audio trigger the processor communicates an undistorted ambient noise signal to the speaker.

2. The method of claim 1, further comprising:
determining, by the processor, that an audio command included within the ambient noise signal is complete; and
resuming, by the processor, communication of the distorted ambient noise signal to the speaker responsively to the determination.

3. The method of claim 1, further comprising:
scanning, by the processor, an ambient noise signal received following receipt of the ambient noise signal containing the audio trigger for the presence of spoken language and
resuming, by the processor, communication of the distorted ambient noise signal to the speaker responsively to a determination that the ambient noise signal received following receipt of the ambient noise signal containing the audio trigger does not include the presence of spoken language.

4. The method of claim 3, wherein the scanning of the ambient noise signal received following receipt of the ambient noise signal containing the audio trigger is continuous.

5. The method of claim 1, further comprising:
determining, by the processor, that an audio command included within the ambient noise signal is complete; and
resuming, by the processor, communication of the distorted ambient noise signal to the speaker responsively to a determination that audio command included within the ambient noise signal is complete.

6. The method of claim 1, wherein the pausing of the communication of the distorted ambient noise signal to a speaker lasts for a duration of time, wherein the duration of time is responsive to an instruction received from a user.

7. The method of claim 1, wherein the audio-activated device includes a camera, the method further comprising:
obscuring, by the processor, the camera; and
upon detection of the audio trigger pausing, by the processor, the obscuring of the camera.

8. The method of claim 1, further comprising:
verifying, by the processor, that a user associated with the audio trigger is an authorized user, wherein the pausing of the communication of the distorted ambient noise signal to the speaker is responsive to a verification that the user is authorized.

9. The method of claim 1, further comprising:
receiving, by the processor, an audio signal that includes a user speaking the audio trigger from the microphone prior to receiving the ambient noise signal;
storing, by the processor, a recording of the audio signal that includes the user speaking the audio trigger;
comparing the detected audio trigger to the recording of the user speaking the audio trigger
verifying, by the processor, that the user speaking the audio trigger is an authorized user responsively to the comparison, wherein the pausing of the communication of the distorted ambient noise signal to the speaker is responsive to a verification that the user is authorized.

10. The method of claim 1, further comprising:
communicating, by the processor, a signal to the speaker that causes the speaker to generate an audio signal corresponding to a command for the audio-activated device.

11. The method of claim 1, further comprising:
pausing, by the processor, the communication of the distorted ambient noise signal to the speaker while the undistorted ambient noise signal is communicated to the speaker.

12. A system comprising:
a microphone configured to detect ambient noise in an environment, convert the ambient noise to an ambient noise digital signal, and communicate the ambient noise digital signal to a processor;
the processor configured to receive the ambient noise digital signal from the microphone, generate a distorted ambient noise signal using the ambient noise signal, scan the ambient noise signal for an audio trigger included therein, wherein upon detection of the audio trigger the processor is further configured to communicate an undistorted ambient noise signal to the speaker; and
a speaker configured to emit distorted ambient sound responsively to the distorted ambient noise signal received from the processor.

13. The system of claim 12, further comprising: a soundproofing material.

14. The system of claim 13, wherein the soundproofing material isolates a microphone of an audio-activated device from ambient sound in an environment.

15. The system of claim 12, further comprising:
a user feedback mechanism configured to provide the user with feedback when the audio trigger is received by the microphone or processor.

16. The system of claim 12, further comprising:
a housing configured to house the microphone, processor, and speaker.

17. The system of claim 16, wherein the housing is configured so that the speaker is proximate to a microphone included in an audio-activated device.

18. The system of claim 12, further comprising:
a device configured to obscure a camera included in an audio-activated device.

19. The system of claim 12, further comprising:
a device configured to obscure a camera included in an audio-activated device when in a closed position and not obscure the camera when in an open position, wherein the processor controls whether device is in an open position.

20. The system of claim 12, further comprising:
a device configured to obscure a camera included in an audio-activated device when in a closed position and not obscure the camera when in an open position, wherein the processor controls whether device is in an open position responsively to a determination that an audio trigger is included in the ambient noise signal.

21. The system of claim 18, wherein the device comprises an electrically sensitive material that transitions from being opaque to transparent responsively to application of electrical voltage or current.

22. A method comprising:
receiving, by a processor, a first audio signal that includes a user speaking a standard audio trigger from a microphone communicatively coupled to the processor;
receiving, by the processor, a second audio signal that includes a user speaking a non-standard audio trigger from the microphone;
storing the first and second audio signals;
receiving, by a processor, an ambient noise signal from a microphone communicatively coupled to the processor;
generating, by the processor, a distorted ambient noise signal;
communicating, by the processor, the distorted ambient noise signal to a speaker communicatively coupled to the processor, the speaker being proximate to a microphone of an audio-activated device; and
scanning, by the processor, the ambient noise for the non-standard audio trigger included therein, wherein upon detection of the audio trigger the processor:
pauses the communication of the distorted ambient noise signal to the speaker;
communicates the second audio signal to the speaker; and
communicates an undistorted ambient noise signal to the speaker, the undistorted ambient noise signal corresponding to the ambient noise received from the microphone.

* * * * *